US009038815B2

(12) United States Patent
Kimura et al.

(10) Patent No.: US 9,038,815 B2
(45) Date of Patent: May 26, 2015

(54) ARTICLE SORTING AND CONVEYING DEVICE

(75) Inventors: Tetsuyuki Kimura, Tokyo (JP); Yasushi Muragishi, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 21 days.

(21) Appl. No.: 14/114,130

(22) PCT Filed: Apr. 26, 2012

(86) PCT No.: PCT/JP2012/061183
§ 371 (c)(1),
(2), (4) Date: Oct. 25, 2013

(87) PCT Pub. No.: WO2012/147838
PCT Pub. Date: Nov. 1, 2012

(65) Prior Publication Data
US 2014/0041987 A1    Feb. 13, 2014

(30) Foreign Application Priority Data

Apr. 27, 2011 (JP) ................................ 2011-100182
Dec. 27, 2011 (JP) ................................ 2011-286776

(51) Int. Cl.
*B65G 27/06* (2006.01)
*B65G 27/32* (2006.01)
*B65G 27/24* (2006.01)
*B65G 47/26* (2006.01)
*B07B 13/11* (2006.01)

(52) U.S. Cl.
CPC .............. *B65G 27/32* (2013.01); *B65G 27/24* (2013.01); *B65G 47/26* (2013.01); *B07B 13/113* (2013.01)

(58) Field of Classification Search
CPC .... B65G 27/24; B65G 47/26; B65G 47/1421; B65G 47/28; B65G 27/32; B65G 2814/0335; B65G 11/02
USPC ....................... 198/443, 445, 752.1, 758, 766
See application file for complete search history.

(56) References Cited

U.S. PATENT DOCUMENTS 3,958,687 A *  5/1976  Adams et al. ................. 198/758
4,795,025 A *  1/1989  Doke et al. .................... 198/763

(Continued)

FOREIGN PATENT DOCUMENTS

JP    2007-168920 A    7/2007
JP    2010-255351      11/2010

OTHER PUBLICATIONS

International Search Report for PCT/JP2012/061183, Mailing Date of Jul. 24, 2012.

*Primary Examiner* — James R Bidwell
(74) *Attorney, Agent, or Firm* — Westerman, Hattori, Daniels & Adrian, LLP

(57) ABSTRACT

An article sorting and conveying device that conveys articles by the vibrations of a movable body provided through an elastic support unit, includes a first vibration unit that imparts a periodic vibration force to the movable body in a direction inclined from a vertical direction; a second vibration unit that imparts a periodic vibration force in a direction crossing the periodic vibration force by the first vibration unit; and a vibration control unit that causes a periodic vibration force imparted by each vibration unit to have a phase difference and occur simultaneously at the same frequency, and that creates an elliptical vibration trajectory in the movable body. The articles are sorted and conveyed on the movable body by setting the vibration trajectory of the movable body by the vibration control unit such that articles having a different coefficient of friction are conveyed in different directions.

6 Claims, 24 Drawing Sheets

(56) References Cited

U.S. PATENT DOCUMENTS

| | | | |
|---|---|---|---|
| 6,374,985 B1 * | 4/2002 | Nakashima et al. | 198/391 |
| 6,782,992 B2 * | 8/2004 | Mimura et al. | 198/443 |
| 7,028,829 B2 * | 4/2006 | Buchi | 198/444 |
| 7,232,026 B2 * | 6/2007 | Heuft et al. | 198/445 |
| 2002/0166753 A1 * | 11/2002 | Morinaka et al. | 198/758 |

* cited by examiner

Fig. 5
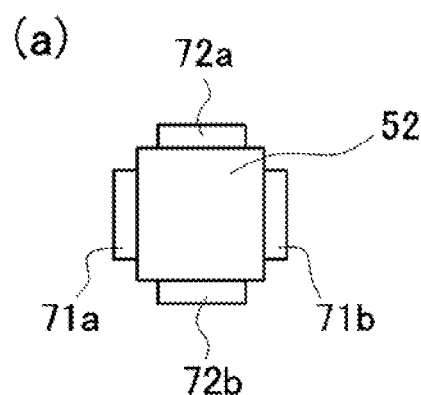
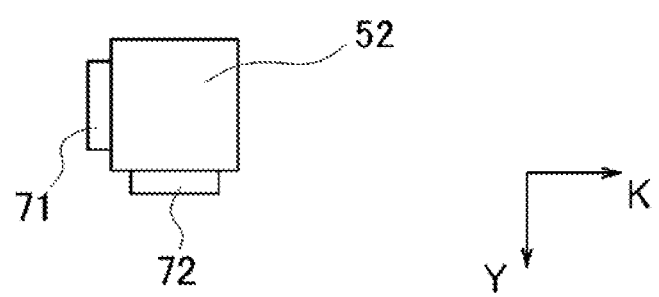

Fig. 18
(a)
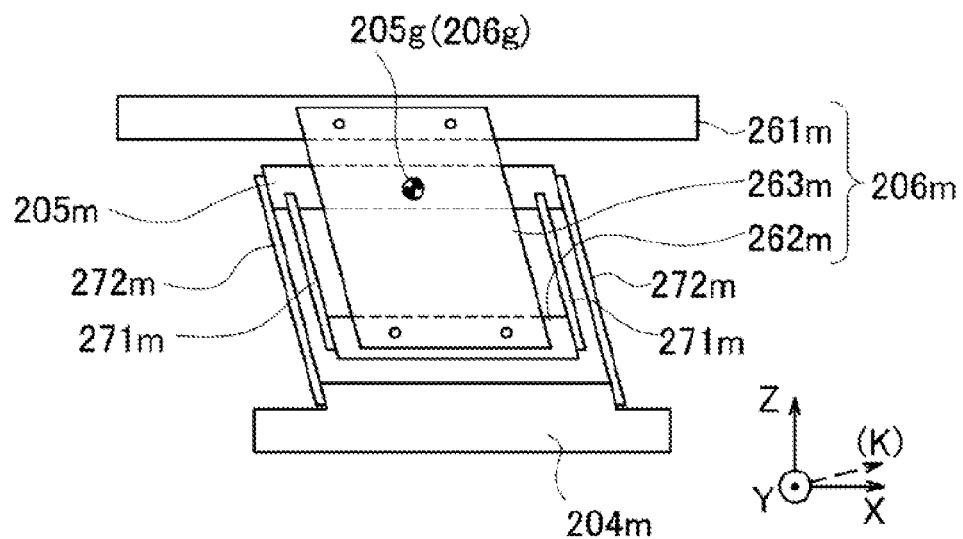
(b)
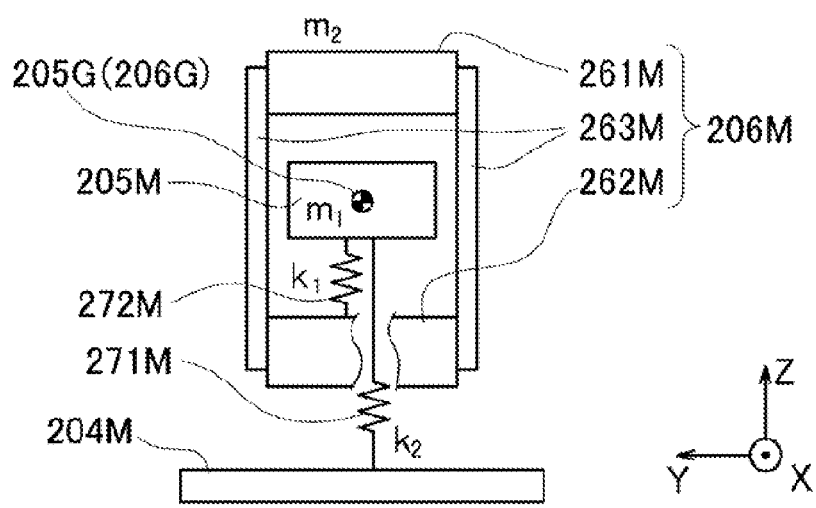

Fig. 20
(a)
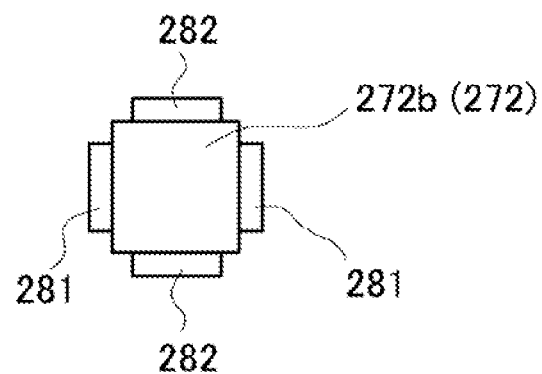
(b)
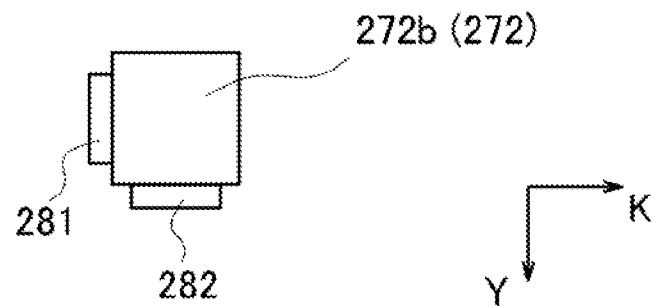

ARTICLE SORTING AND CONVEYING DEVICE

TECHNICAL FIELD

The present invention relates to an article sorting and conveying device with which it is possible to sort and convey a plurality of articles by vibration.

BACKGROUND ART

Conventionally, a large number of article conveying devices are known such as a linear feeder that makes use of vibrations, and it is disclosed an article conveying device such as that according to Patent Literature 1, which develops such a technology.

Such a device is configured to generate elliptical vibrations by imparting vibrations having the same frequency in the vertical and horizontal directions to a movable body that has a trajectory for conveying articles, and to enable alteration of the conveyance directions by setting the phase difference of the vibrations in each direction in accordance with the coefficient of friction. By using such a device, two articles having different coefficients of friction can be simultaneously loaded on a conveyance surface, and by imparting vibrations having a predetermined phase difference in accordance with the coefficient of friction, the articles can be sorted by conveying each in the opposite direction.

Furthermore, Patent Literature 2 discloses a component feeding device that transfers components in a straight line, and has a configuration in which an intermediate bench (piezoelectric drive unit) is elastically supported relative to a base unit (substrate) by a pair of plate springs, and a movable body (vibration transmitting unit), which has a conveyance path on an upper surface, and a counter weight are joined together and provided so as to sandwich the intermediate bench while being elastically supported by the intermediate bench. Thus, even when vibrations are generated by imparting a driving force to the movable body from the intermediate bench side, stable conveyance can be performed without any tilting and swinging of the movable body.

CITATION LIST

Patent Literature

[PTL 1] Japanese Unexamined Patent Application Publication No. 2010-255351
[PTL 2] Japanese Unexamined Patent Application Publication No. 2007-108920

SUMMARY OF INVENTION

Technical Problem

However, according to the article conveying device of the above-described Patent Literature 1, although the vibration components of the two directions, namely the horizontal and the vertical are combined to generate an elliptical vibration trajectory, and the vibration trajectory is used to sort the articles, the direction in which the vibration trajectory is generated is restricted, because of which the degree of freedom of the direction of movement, of the articles to be conveyed is small. Therefore, when the device is incorporated in a production line and used, the design freedom with regard to the direction of the conveyance path reduces.

In order to solve the above problem, an object of a first invention of the present application is to provide an article sorting and conveying device, which can sort articles, and at the same time, can convey each of the sorted articles in an optional direction, and which is able to be easily used in a production line.

In addition, even if the above problem can be resolved, the size of the device may increase due to increased complexity of the overall configuration of the device, and the desired vibration trajectory may not be obtained because of instability of the support of the movable body, which may make the sorting and conveyance of articles difficult.

Furthermore, when an article conveying device such as that described above is used, in order to prevent the vibrations from being transmitted to the installation surface, generally, a spring vibration isolator is provided on the lower surface of a substrate that acts as a so-called base, and the entire vibration equipment is elastically supported relative to the installation surface. Thus, the transmission of vibrations to the surrounding devices and the generation of noise are controlled, and the surrounding environment can be maintained properly.

However, in such a configuration, when a vibration force works on the movable body, a rotational moment is generated between the substrate and the movable body, and the posturing of the substrate that is supported through the spring vibration isolator becomes unstable. Therefore, the vibrations of the movable body that is elastically supported relative to the substrate also become unstable, and it may not be possible to generate the desired vibration trajectory in the movable body. In addition, such a problem is expected to appear more remarkably when the overall configuration becomes more complex and larger in size, as described above. In order to solve such a problem, even if the technology disclosed in Patent Literature 2 is simply introduced with the view of stabilization of the vibrations of the movable body, an extremely complex configuration may result.

In order to solve the problems described above, an object of a second invention of the present application is to provide an article sorting and conveying device, which, in spite of having a simple configuration, can generate stable elliptical vibrations in the movable body, which can sort articles in a stable manner by the vibrations, and at the same time, can convey each of the sorted articles in an optional direction, and which is able to be easily used in a production line.

Solution to Problem

The present invention adopts the following means in order to achieve this object.

That is, an article sorting and conveying device according to the first invention is an article sorting and conveying device that is provided with a movable body provided on a substrate through an elastic support means and that conveys the articles loaded on the movable body by the vibrations of the movable body, comprising: a first vibration means that imparts a periodic vibration force to the movable body in a direction inclined from a vertical direction; a second vibration means that imparts a periodic vibration force to the movable body in a direction crossing the periodic, vibration force by the first vibration means; and a vibration control means that controls each vibration means to cause a periodic vibration force imparted by each vibration means to have a phase difference and occur simultaneously at the same frequency, and to create an elliptical vibration trajectory in the movable body, wherein the articles are sorted and conveyed on the movable body by setting the vibration trajectory of the movable body by the vibration control means such that articles having a different coefficient of friction are conveyed in different directions.

By thus configuring the device, a plurality of articles can be conveyed in one direction, and the conveyance direction can be altered on the basis of the difference in the coefficient of friction, and as a result, the articles can be sorted automatically without using inspection equipment, such as a camera and image processing apparatus, and special equipment for sorting. In addition, because the conveyance surface can be configured as a flat surface, articles ranging from a large size to a small size can be handled by a single device.

In addition, in order to be able to stabilize the direction of movement of the articles and convey each article in a predetermined direction, it is favorable to configure the device by providing a guide, on the movable body, which moves the sorted articles along a predetermined trajectory.

Furthermore, in order to be able to easily switch between conveying a plurality of articles in the same direction, and conveying each article in a different direction, a vibration switching means that switches the vibration trajectory of the movable body in a different vibration trajectory is provided such that the vibration switching means is preferably configured to internally store data of a phase difference according to which articles having a different coefficient of friction are conveyed in a different direction, and data of a phase difference according to which articles having a different coefficient of friction are conveyed in the same direction, which constitutes the phase difference of the periodic vibration force by each of the vibration means, and to switch the phase difference in accordance with a signal input from outside.

Furthermore, the article sorting and conveying device of a second invention comprises: a substrate; an intermediate bench that is elastically supported relative to the substrate by a plurality of first rod-shaped spring members provided almost parallel and at an inclination with respect to a vertical direction; a movable body that is elastically supported relative to the intermediate bench by second rod-shaped spring members provided almost parallel to the first rod-shaped spring members, and on top of which is formed a conveyance surface on which the articles are loaded and conveyed; a first vibration means and second vibration means each of which imparts a periodic vibration force from the intermediate bench side to the movable body in a first direction and a second direction that cross each other and are perpendicular to a longitudinal direction of the second rod-shaped spring members; and a vibration control means that controls each vibration means to cause a periodic vibration force imparted by each vibration means to have a phase difference and occur simultaneously at the same frequency, and to create an elliptical vibration trajectory in the movable body, wherein the center of gravity of the movable body is configured to almost match to the center of gravity of the intermediate bench, and it is configured such that the articles are sorted and conveyed on the movable body by setting the vibration trajectory of the movable body by the vibration control means such that articles having a different coefficient of friction are conveyed in different directions.

By thus configuring the device, along with having a simple device configuration, a three-dimensional elliptical vibration trajectory can be generated in a stable manner without giving rise to titling or turning in the conveyance bench, and by controlling the vibrations in accordance with the nature of the articles, the articles can be sorted, and each of the sorted articles can be conveyed in an optional direction. In addition, in order to achieve a smaller and lighter device by simplifying the device configuration through the implementation of the above configuration in a simpler manner, the movable body is favorably configured by a lower movable bench arranged downward of the intermediate bench, a conveyance bench arranged upward of the intermediate bench and including the conveyance surface, and a connecting member that connects the lower movable bench and the conveyance bench.

Effects of Invention

According to the first invention described above, it is possible to provide an article sorting and conveying device having a simple configuration, by which a plurality of articles are sorted simultaneously and each article can be conveyed in an optional direction, and additionally, articles having several sizes and shapes can be handled. Furthermore, according to the second invention, it is possible to provide an article sorting and conveying device having a simple configuration, which can generate stable vibrations by the movable body, which can sort articles in a stable manner by the vibrations, and can convey each of the sorted articles in an optional direction, and which is able to be easily used in a production line.

BRIEF DESCRIPTION OF DRAWINGS

FIG. 1 is a system configuration diagram of an article sorting and conveying device according to a first embodiment of the present invention.

FIG. 2 is a perspective view of a mechanical device unit of the article sorting and conveying device.

FIG. 3 is a side view of a mechanical device unit of the article sorting and conveying device.

FIG. 4 is a side view illustrating an operation, of a mechanical device unit of the article sorting and conveying device, in a K direction.

[FIG. 5] FIGS. 5(a) and 5(b) each is a view on an arrow of an A-A cross section in FIG. 3 illustrating a cross section of a spring member of the article sorting and conveying device.

FIG. 6 is a schematic view illustrating an operation principle of the article sorting and conveying device.

FIG. 7 is a diagram illustrating a relationship between the phase difference among periodic vibration forces exerted in each direction in the article sorting and conveying device and the conveyance speed of the articles.

FIG. 8 is a diagram illustrating a relationship between the amplitude of the periodic vibration forces exerted in a horizontal direction in the article sorting and conveying device and the conveyance speed of the articles.

FIG. 10 is a perspective view illustrating a modification of a mechanical device unit in the article sorting and conveying device.

FIG. 11 is a perspective view illustrating a modification, of a mechanical device unit in the article sorting and conveying device, that is different from FIG. 10.

FIG. 12 is a perspective view illustrating a modification, of a mechanical device unit in the article sorting and conveying device, that is different from FIG. 10 and FIG. 11.

FIG. 13 is a system configuration diagram of an article sorting and conveying device according to a second embodiment of the present invention.

FIG. 14 is a perspective view of a mechanical device unit of the article sorting and conveying device.

FIG. 15 is a side view of a mechanical device unit of the article sorting and conveying device.

FIG. 16 is an enlarged perspective view of a part A and the surrounding portion thereof in FIG. 14.

FIG. 17 is an enlarged perspective view of a part B and the surrounding portion thereof in FIG. 14.

[FIG. 18] FIGS. 18(a) and 18(b) each is a schematic view illustrating a support structure in a mechanical device unit of the article sorting and conveying device.

FIG. 19 is a side view illustrating an operation, of a mechanical device unit of the article sorting and conveying device, in a K direction.

[FIG. 20] FIGS. 20(a) and 20(b) each is a schematic view illustrating a cross section of a second rod-shaped spring member configuring a part of the article sorting and conveying device.

FIG. 21 is a schematic view illustrating an operation principle of the article sorting and conveying device.

FIG. 23 is a perspective view illustrating a modification, of the mechanical device unit of the article sorting and conveying device, in which a configuration of a vibration means has been changed.

FIG. 24 is a front view illustrating a modification of the mechanical device unit.

DESCRIPTION OF EMBODIMENTS

Embodiments of the present invention will be explained below with reference to the drawings.

<First Embodiment>

Figure 1:
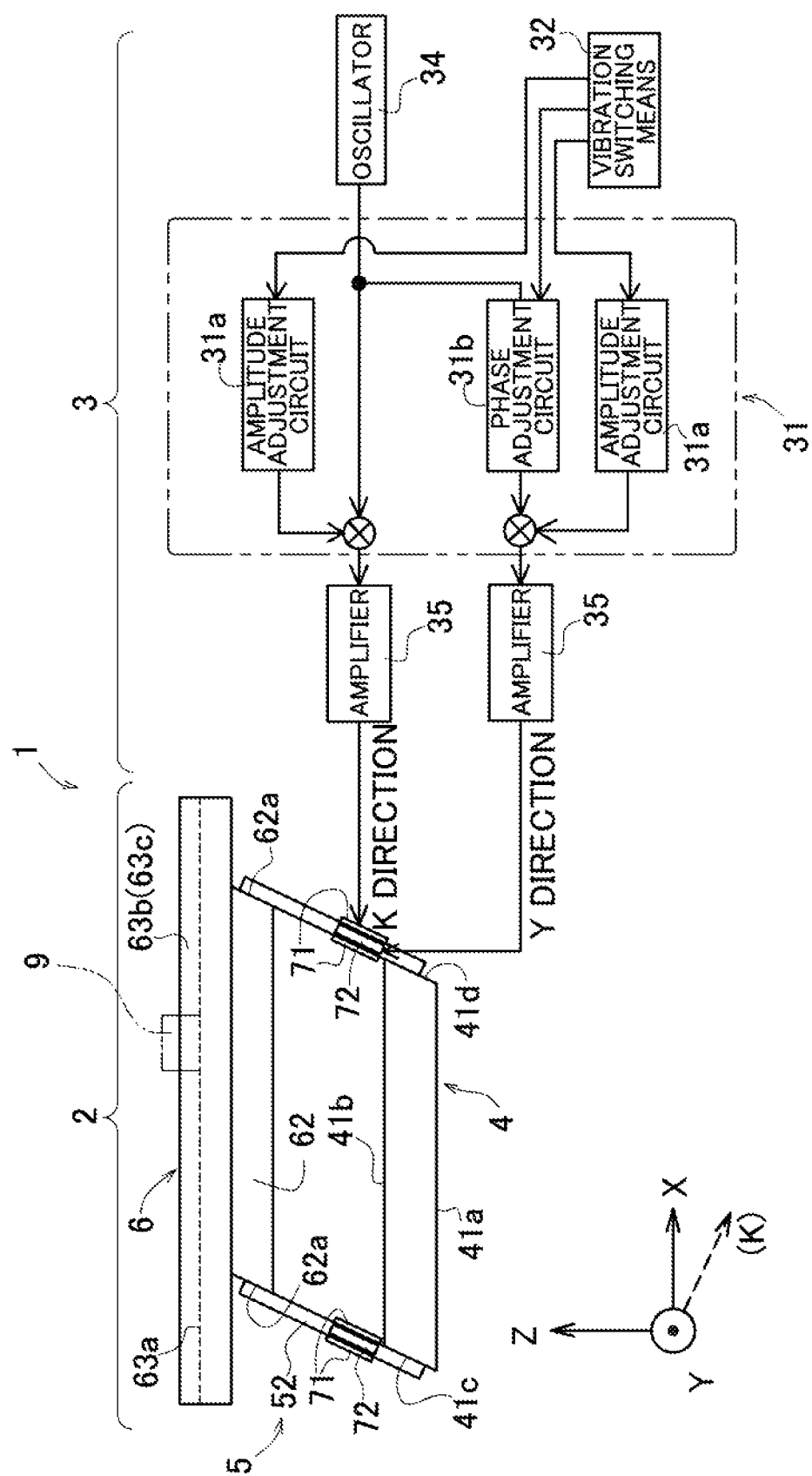
[FIG. 1]

As illustrated in FIG. 1, an article sorting and conveying device 1 according to a first embodiment is configured mainly by a mechanical device unit 2 and a control system unit 3. As described later, the control system unit 3 is configured to generate vibrations in the mechanical device unit 2 by imparting a periodic vibration force in each of K and Y directions by controlling piezoelectric elements 71 and 72 incorporated in the mechanical device unit 2.

In the present embodiment, the K direction is the direction perpendicular to the attaching surface of the piezoelectric elements 71 on an elastic support member 52, and the Y direction is the direction perpendicular to a paper surface. In addition, X and Z directions described later are also defined as illustrated in the axis of coordinates shown at the bottom left of the figure. Therefore, the K direction includes the components of the X direction and the Z direction, and is parallel to the XZ plane. Hereinafter, the explanation will be continued based on the axis of coordinates.

Figure 2:
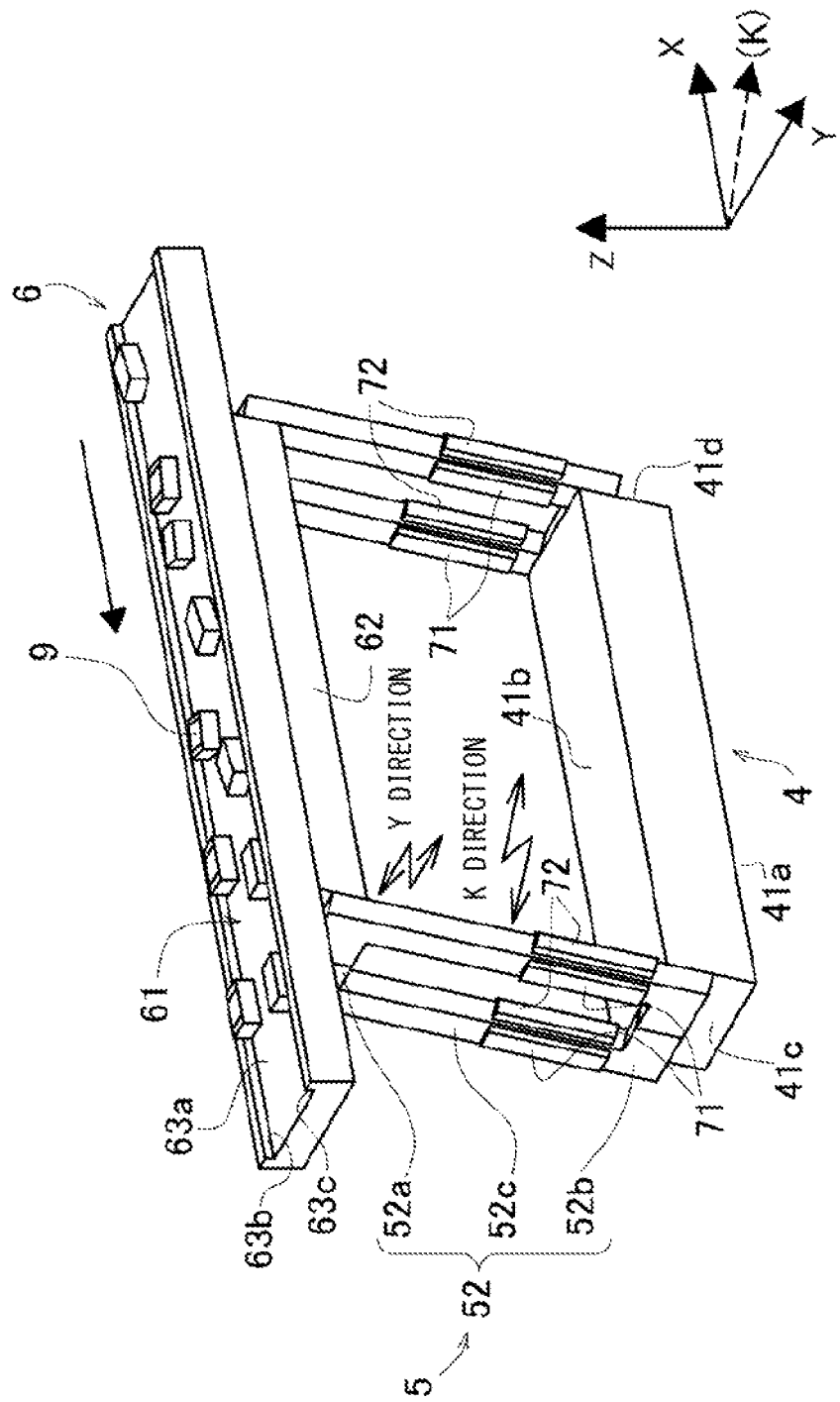
[FIG. 2]
Figure 3:
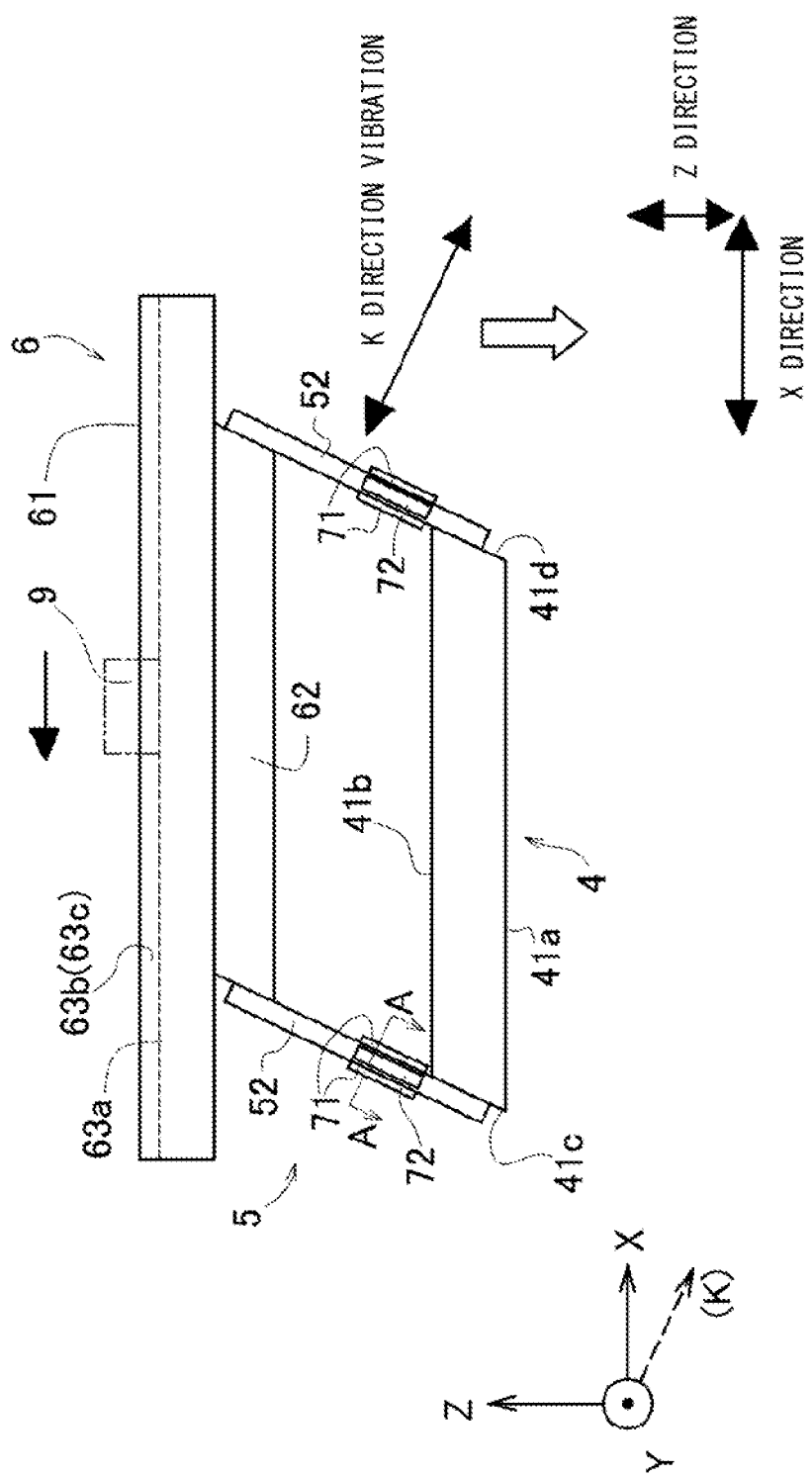
[FIG. 3]

As illustrated in FIG. 2 and FIG. 3, the mechanical device unit 2 is configured mainly by a substrate 4 that is fixed on a floor, a movable bench 6 functioning as a movable body that sorts and conveys an article 9 loaded atop by vibrating relative to the substrate 4, and elastic support means 5 that elastically supports the movable bench 6 relative to the substrate 4. It is favorable to install an elastic body having a small spring constant, such as a rubber vibration isolator, which is not shown in the figure, under the substrate 4 to be able to reduce the counterforce on the floor used for installation.

The substrate 4 is rectangular in shape of which the bottom surface 41a faces the long side in the X direction, and a top surface 41b has the same shape as the bottom surface 41a and is shifted in the X direction. Therefore, a front surface 41c and a rear surface 41d are inclined with respect to the bottom surface 41a and the top surface 41b.

Also, two spring members 52, which are rod-shaped springs configuring the elastic support means 5, are mounted on each of the front surface 41c and the rear surface 41d. The spring members 52 are fixed onto the front surface 41c or the rear surface 41d of the substrate 4 by a lower mounting unit 52b formed in the shape of a plate, and are connected to a support block 62 provided at the bottom of the movable bench 6 by an upper mounting unit 52a formed in the shape of a plate perpendicular to the K and the Y directions and extending out toward the upper left side in the figure from the mounting unit 52b. In the spring members 52, an intermediate unit 52c present between the upper mounting unit 52a and the lower mounting unit 52b has a cross section formed in the shape of a square.

Based on the form of the plate arranged horizontally, a conveyance path 63a is formed appropriately on the upper surface 61 of the movable bench 6, which is the conveyance surface, in accordance with the corresponding production line and the article 9. In FIG. 2, as an example, a case in which parallel wall surfaces 63b and 63c are formed as guides on the left and right of the conveyance direction is described. As described earlier, the support block 62 is fixed and provided at the bottom of the movable bench 6, and the movable bench 6 is connected to the four spring members 52 in the support block 62.

Because of such a configuration, the four spring members 52 operate just like a parallel link mechanism, and the movable bench 6 can move in each direction while maintaining a horizontal state.

In addition, the piezoelectric elements 71 and 72 are provided as described below in the form of drive units for causing the movable bench 6 to vibrate in each of the X, Y, and Z directions.

First of all, as a first vibration means that imparts vibrations in the K direction, rectangular parallelepiped first piezoelectric elements 71 are attached on the surface perpendicular to the X axis at the side surfaces below the center of the longitudinal direction of the intermediate unit 52c of the spring members 52. Moreover, as a second vibration means that imparts vibrations in the Y direction, rectangular parallelepiped second piezoelectric elements 72 are attached on the surface perpendicular to the Y axis at the side surfaces below the center of the longitudinal direction of the intermediate unit 52c of the spring members 52. Through the impression of voltage, the piezoelectric elements 71 and 72 can be elongated in the entire length, and therefore, as shown in FIG. 4 as an example, it is possible to bend the spring members 52 and produce a displacement in the movable bench 6 in the K direction or the Y direction.

In the present embodiment, as illustrated in FIG. 5(a), the piezoelectric elements are configured as a bimorph type with each of first piezoelectric elements 71a and 71b and second piezoelectric elements 72a and 72b provided in pairs in the opposing surfaces on each spring member 52. As in the present embodiment, when the spring member is bent by using the elongation of the piezoelectric elements, then if one of the piezoelectric elements provided on opposing surfaces is set in the elongation side, the other piezoelectric element must be set in the constriction side, and therefore, when one side is considered as the elongation side, the voltage impression and attaching direction are set so that the other side becomes the constriction side. Hereinafter, with regard to the voltage applied to the piezoelectric elements, a simple explanation is provided as the X-direction control voltage and the Y-direction control voltage, and the impression of a positive control voltage in the X direction and the Y direction indicates the impression of a voltage for elongating and constricting the first piezoelectric elements 71 and the second piezoelectric elements 72 so as to bend the spring members 52 toward the direction of movement of the movable bench 6 in each of positive X and Y directions.

Figure 4:
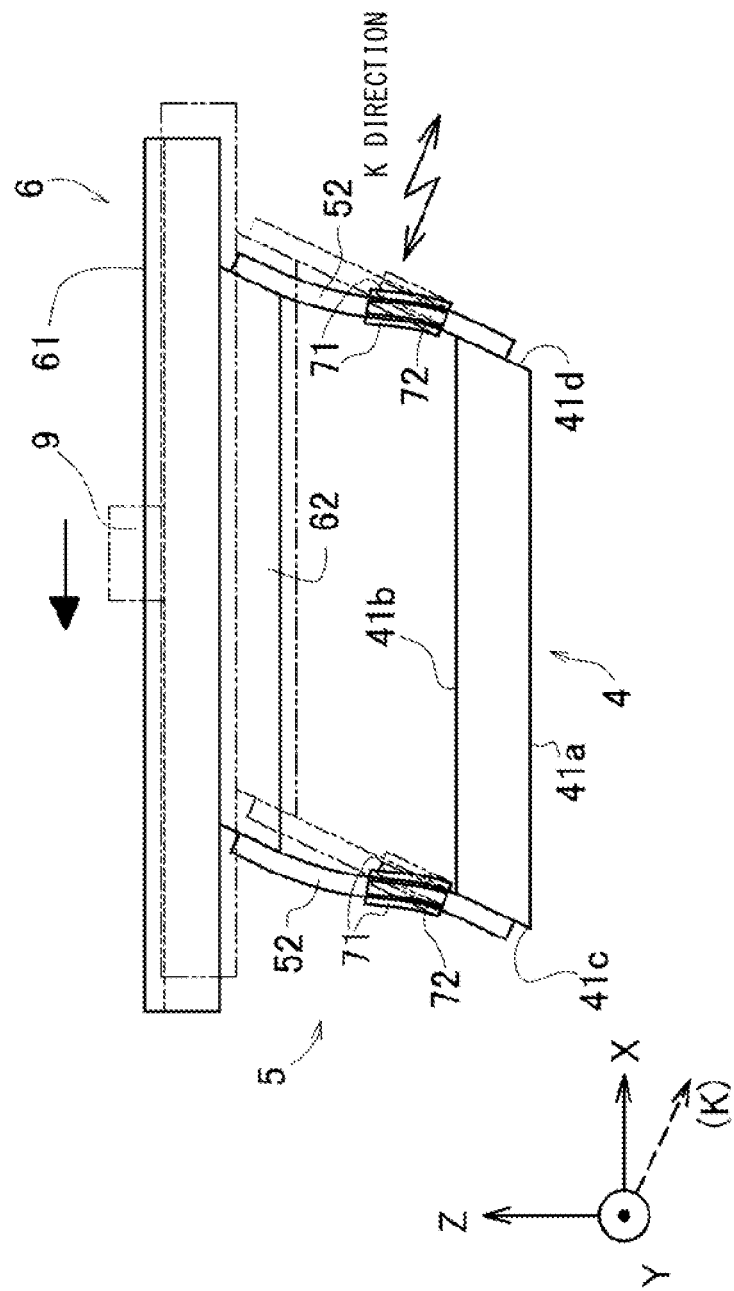
[FIG. 4]

Furthermore, in order to bring about a deformation in the spring member 52, the elongation side and the constriction side are reversed between the top and the bottom in one surface, with the center of the longitudinal direction of the intermediate unit 52c as the boundary, as shown in FIG. 4. Thus, the attachment of the first piezoelectric elements 71 and the second piezoelectric elements 72 in a wide range that is in excess of the surrounding of the center of the longitudinal direction obstructs the deformation on the contrary, which is not preferable. Therefore, as in the present embodiment, it is more efficient to attach the piezoelectric elements at a position closer to one end from near the center of the longitudinal direction.

By applying sinusoidal control voltage to each of the first piezoelectric elements 71 and the second piezoelectric elements 72, the control system unit 3 generates a periodic vibration force for generating vibrations in each of the K and Y directions while the mechanical device unit 2 is configured as described above.

Therefore, as illustrated in FIG. 1, the control system unit 3 includes an oscillator 34 for generating sinusoidal voltage, and the sinusoidal voltage is output to each piezoelectric element 71 and 72 after being amplified by an amplifier 35. In addition, the control system unit 3 includes a vibration control means 31 for making detailed adjustment of the control voltage in each of the K and Y directions. It must be noted that by setting the frequency of the vibrations generated by the oscillator 34 as the frequency resonating with the vibration system of either of the K or Y directions, electric power is saved by amplifying the vibrations. In such a case, in order to avoid the vibrations of both vibration systems from interfering with each other, the natural frequency of each direction may be separated. At this time, the natural frequency in each direction may be separated by approximately −10% to +10%, for example.

The vibration control means 31 is configured mainly by an amplitude adjustment circuit 31a for adjusting the amplitude of the control voltage in each of the K and Y directions, and a phase adjustment circuit 31b for adjusting each phase difference. In the present embodiment, it is configured such that the amplitude adjustment circuit 31a corresponding to each of the control voltages of K and Y is present, and the phase adjustment circuit 31b that adjusts the phase of the control voltage with reference to the phase of the control voltage in the K direction so as to result in a predetermined phase difference from the phase of the control voltage in the K direction is provided for the control voltage of Y.

Moreover, in order to obtain a conveyance direction and a conveyance speed in accordance with the article 9 to be conveyed, the control system unit 3 includes a vibration switching means 32 that switches the amplitude and phase of the control voltage applied to the piezoelectric elements 71 and 72 that impart a periodic vibration force in each direction. Based on a signal from outside, which is not shown in the figure, the vibration switching means 32 determines the specific control value of the amplitude and phase of the control voltage of each piezoelectric element 71 and 72 corresponding to a predetermined direction in order to appropriately change the conveyance direction of the article 9 to the predetermined direction, and sends an instruction to an amplitude adjustment circuit 31a and a phase adjustment circuit 31b to perform adjustment to the control value.

The article sorting and conveying device 1 configured as described above specifically performs an operation relative to the article 9 on the basis of the principle described below. In order to simplify the explanation, let the above-described vibration component of the K direction be disintegrated into vibrations in the X direction and the Z direction.

Figure 6:
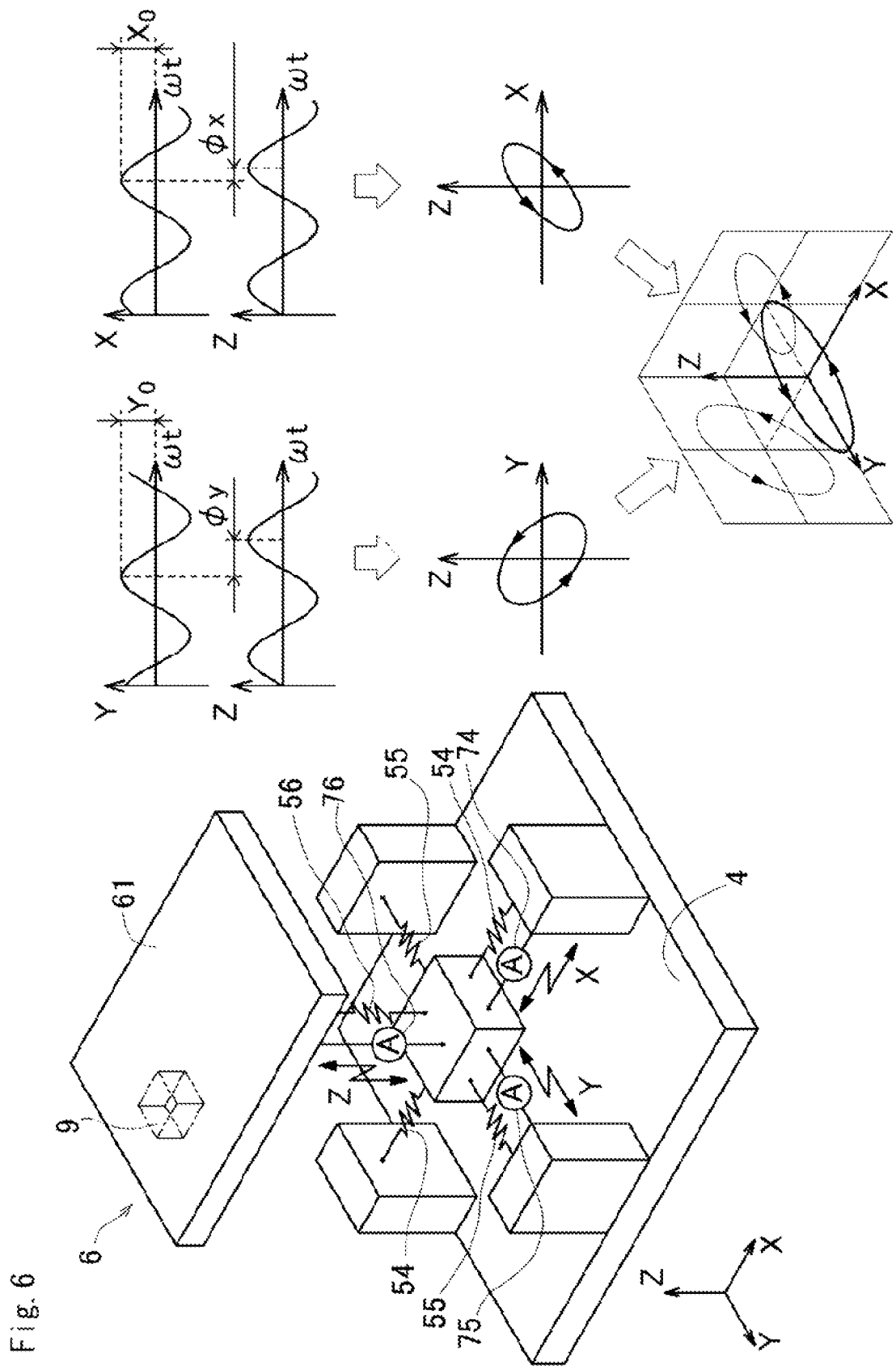
[FIG. 6]

A simplified model of the present article sorting and conveying device 1 as shown in the schematic view in FIG. 6 is assumed, and a case in which the movable bench 6 is elastically supported by elastic bodies 54, 55, and 56 relative to the substrate 4 in each of the X, Y, and Z directions, and vibration means 74, 75, and 76 are provided for each direction, is considered. As a result of such a configuration, it is possible to operate the movable bench 6 in three directions by the vibration means 74, 75, and 76 provided in the three, that is, X, Y, and Z directions. The elastic bodies 54, 55, and 56 in the schematic view in FIG. 6 correspond to the spring members 52 in FIG. 1, and the vibration means 74, 75, and 76 in FIG. 6 correspond to each piezoelectric element 71 and 72.

A periodic vibration displacement expressed by $Z = Z_0 \times \sin\omega t$ is applied in the Z direction relative to the movable bench 6 of the model illustrated in FIG. 6. $Z_0$ indicates the amplitude in the Z direction, $\omega$ indicates the angular frequency, and t indicates the time. In addition, in each of the X and Y directions, vibrations having the same frequency as the Z direction are applied as indicated by the formulas $X = X_0 \times \sin(\omega t + \phi x)$, $Y = Y_0 \times \sin(\omega t + \phi y)$. $X_0$ and $Y_0$ indicate the amplitude in the X direction and the Y direction, respectively, and $\phi x$ and $\phi y$ indicate the phase difference of the vibrations in the X direction and the Y direction with respect to the vibrations in the Z direction.

By thus applying a sinusoidal periodic vibration displacement in each of the X, Y, and Z directions, vibrations having an elliptical trajectory in a plane that is inclined relative to the vertical plane and the horizontal plane, which is called a three-dimensional vibration trajectory in the present invention in which the periodic vibration displacements in the three directions are combined together, or vibrations having a solid trajectory outside the plane can be generated relative to the movable bench 6. For example, as illustrated in FIG. 6, when vibrations are generated in the X and Y direction by providing a phase difference of $\phi x$ and $\phi y$ to the vibration component of the Z direction, vibrations having an elliptical trajectory with the right side on top are generated on the XZ plane in a two-dimensional manner, and vibrations having an elliptical trajectory with the right side at the bottom are generated on the YZ plane. In addition, by combining together the two vibrations, an elliptical trajectory on a three-dimensional space like a three-dimensional vibration trajectory is generated as illustrated at the bottom right of the figure.

Also, by changing the amplitude and phase of the vibration displacement in each direction, the size and direction of the two-dimensional elliptical trajectory in the XZ plane and the YZ plane can be changed, and in correspondence, the size and direction of the elliptical trajectory on the three-dimensional space can be changed freely. It must be noted that in order to thus impart the periodic vibration displacement in each direction, it is controlled that a periodic vibration force is imparted in each direction.

As described above, when the movable bench 6 vibrates while tracing an elliptical trajectory, the article 9 loaded on top of the movable bench 6 starts moving. Also, in this movement, the movement, speed component in the X direction can be controlled by the elliptical trajectory in the XZ plane, and the movement speed component in the Y direction can be controlled by the elliptical trajectory in the YZ plane. That is, by changing the amplitude and the phase difference of the vibrations in each of the X direction and the Y direction with reference to the vibration component of the Z direction, the movement speed component in the X and Y direction can be changed and conveyance can be performed in any direction.

Specifically, the change in the movement speed component in each direction is performed as described below.

Figure 7:
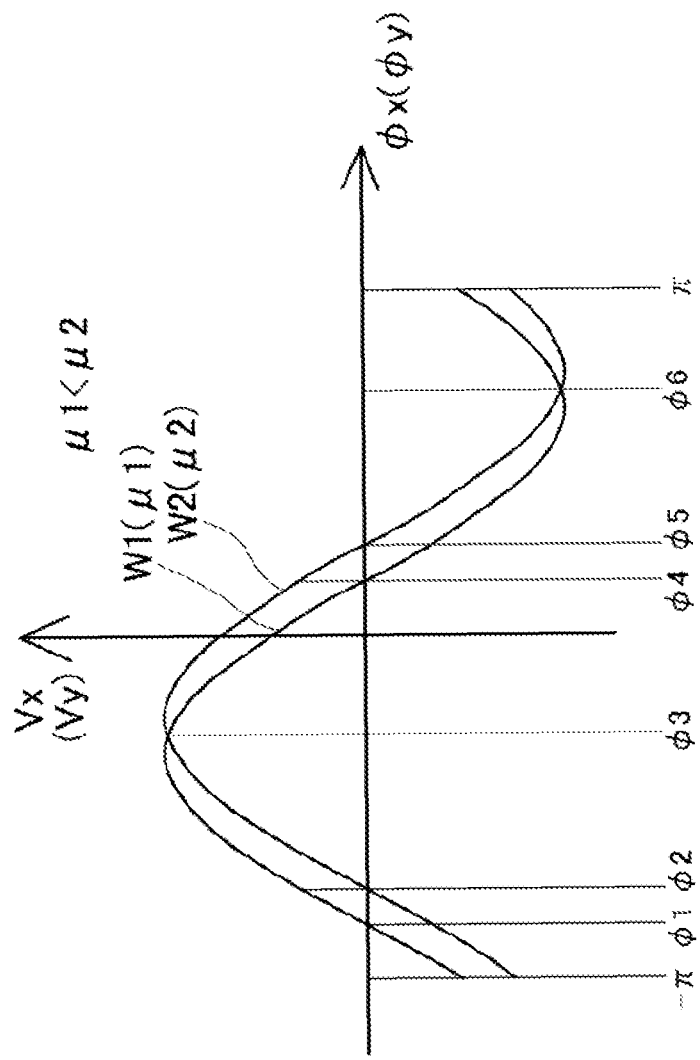
[FIG. 7]

According to the knowledge of the inventors, if explanation is provided by using FIG. 7 while referring to FIG. 6, as a result of the phase difference φx (φy), the movement speed Vx (Vy) of the article 9 changes so as to trace a curve similar to a sinusoidal wave, and the movement speed Vx (Yy) also changes depending on the coefficient of friction between the article 9 and the movable bench 6. In other words, when the coefficient of friction between two types of articles 9 indicated by W1 and W2 and the movable bench 6 is μ1 and μ2 respectively, satisfying the relationship μ1 <μ2, the graph of the movement speed of W2 is the shape obtained by shifting the curve of the movement speed of W1 in a direction in which the phase difference becomes positive. Therefore, when articles 9 having different coefficients of friction are simultaneously kept on the movable bench 6 for which elliptical vibration is to be performed, the movement speed and the direction of movement are altered.

Specifically, when φx is set as the phase difference of φ1 illustrated in FIG. 7, the X-direction movement speed of W1 becomes 0, and W2 takes a negative value. Also, when a phase difference is set between φ1 and φ2, W1 proceeds in a positive direction and W2 proceeds in a negative direction, which are mutually opposite directions. In the case of phase difference of φ2, the speed of W2 becomes 0, and W1 has the speed of the positive direction. In addition, between φ2 and φ4, both W1 and W2 proceed in the positive direction, and at φ3 therein, both W1 and W2 have the same speed, and at a point before and after φ3, the size of the speed of W1 and W2 is reversed. Furthermore, when the phase difference is φ4, the speed of W1 becomes 0, and W2 moves in the positive direction. In the range of the phase difference of φ4 to φ5, W1 proceeds in the negative direction, and W2 proceeds in the positive direction. In addition, at φ5, the speed of W2 becomes 0, and W1 proceeds in the negative direction. Furthermore, in the range of φ5 to π, both W1 and W2 proceed in the negative direction, however, within this range, both have the same speed at φ5, and the speed is reversed at the points before and after φ5. Such a relationship is applicable also for the movement, speed Vy in the Y direction.

Figure 8:
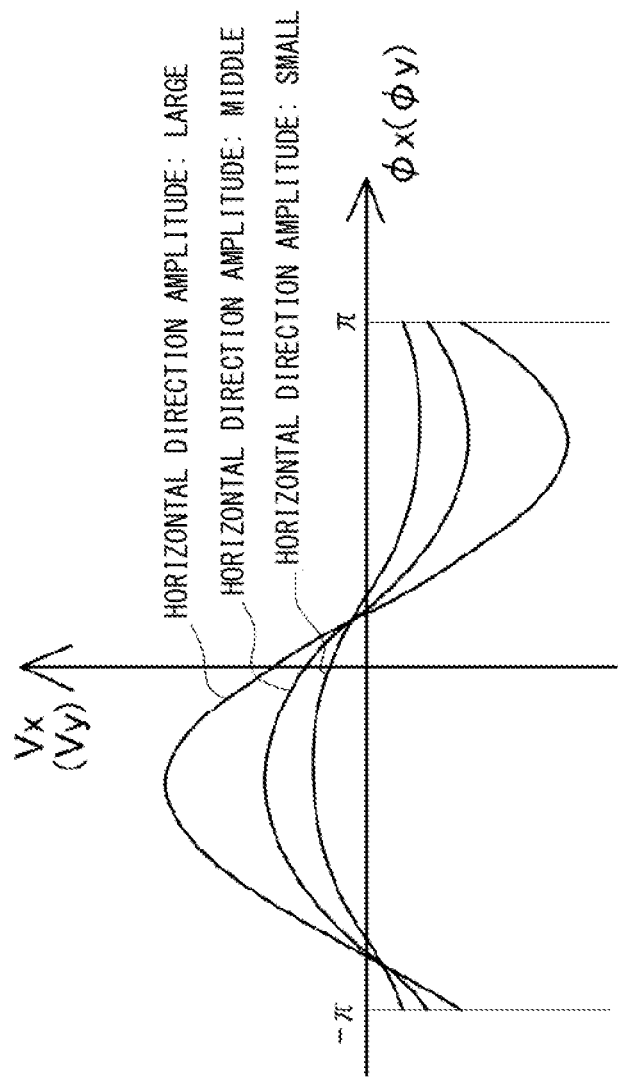
[FIG. 8]

According to the knowledge of the inventors, if explanation is provided by using FIG. 8 while referring to FIG. 6, the relationship between the phase difference φx (φy) and the movement speed Vx (Vy) of the article 9 changes also by changing the amplitude $X_0$ ($Y_0$). That is, the curve that is similar to a sinusoidal wave, which is the movement speed Vx (Vy) of the article 9 with respect to the phase difference φx (φy), generally changes in proportion to the amplitude $X_0$ ($Y_0$) of the vibration displacement. Therefore, when the movement speed Vx (Vy) of the article 9 is to be doubled, generally, the amplitude of the vibration displacement in the X (Y) direction may be doubled. For achieving this, the amplitude of the control voltage may be changed in order to impart a corresponding vibration force.

By thus applying the vibration control for one direction simultaneously to the perpendicular X and Y directions, a plurality of types of articles 9 having different coefficients of friction can be sorted on the movable bench 6, and can be conveyed in different directions. As described above, by performing control to convey articles 9 having different coefficients of friction in different directions, the conveyance direction can be altered even for articles that can be conceived as having apparently different coefficients of friction, such as different surface profile even when the coefficient of friction is strictly the same. For example, this holds true in a case where the same article has a top surface and a back surface, and the ruggedness of the surface is different, and the contact area with the movable bench 6 is largely different between the two surfaces, and even in such a case, sorting and conveyance can be appropriately performed.

However, having three different vibration means in three directions, as described above, is not mandatory when the objective is to sort a plurality of types of articles 9 in two directions while conveying the articles 9. This is because as understood from FIG. 7, with regard to the X direction, when conveyance is to be performed only in one direction, and proceeding in the reverse direction is not necessary, the phase difference relative to the Z direction may be set to 0, that is, driving may be performed in the same phase. Thus, in the present embodiment, a single unit can be configured as the vibration means 71 of the K direction that has the vibration components of the Z direction and the X direction.

In contrast, since it is necessary to have a function of performing sorting in accordance with the types of the article 9 in the Y direction, it is configured such that the switching of the phase difference relative to the periodic vibration force in the Z direction, that is the phase difference relative to the periodic vibration force of the K direction, in accordance with the coefficient of friction of the articles is enabled.

Figure 9:
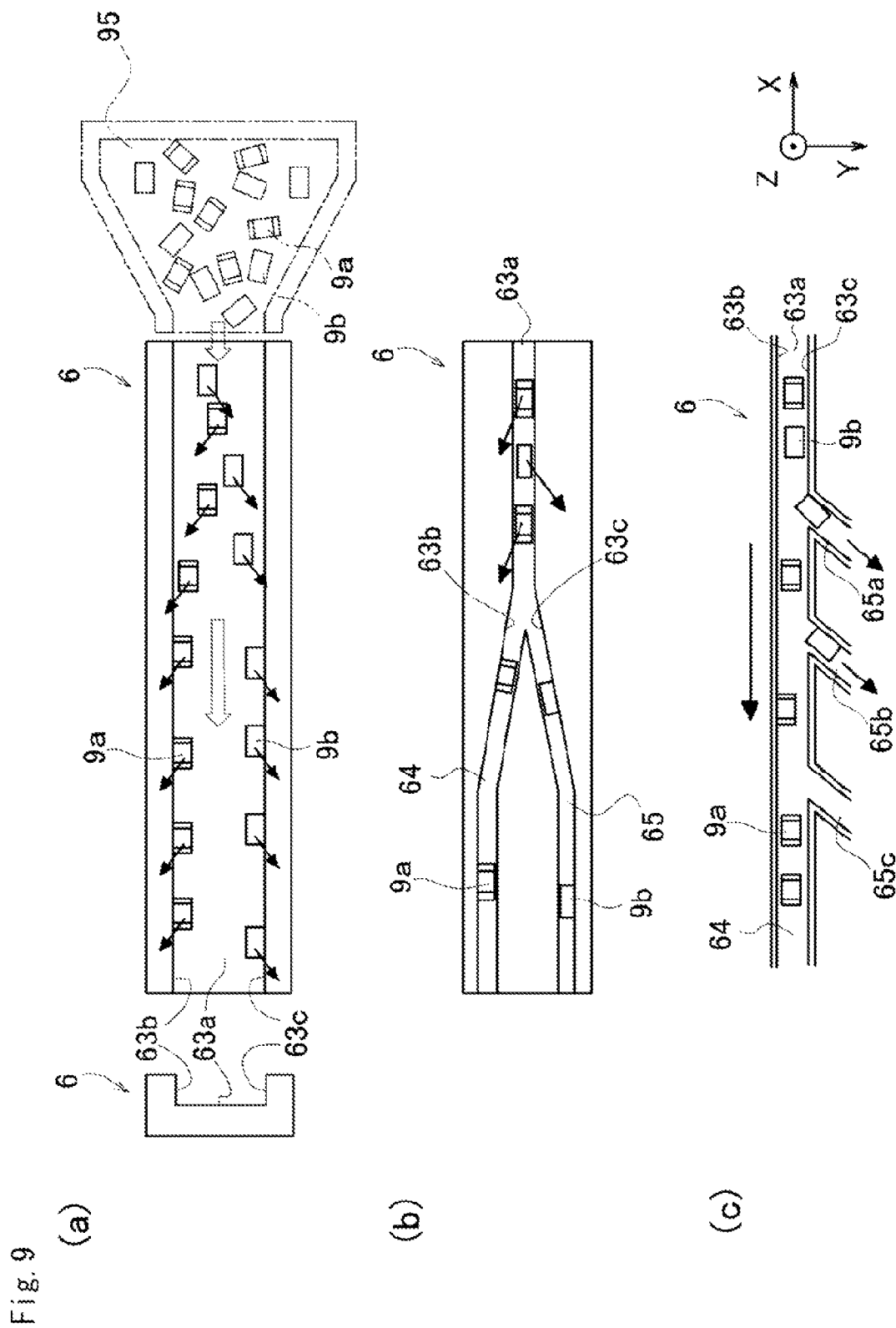
[FIG. 9] FIG. 9(a)-9(c) each is a top view illustrating a conveyance path in the article sorting and conveying device.

The present article sorting and conveying device 1 that is thus configured enables conveyance and sorting of article 9, as illustrated in FIG. 9(a) through FIG. 9(c).

FIG. 9(a) is an example in which the wide conveyance path 63a is formed on the movable bench 6, and the parallel wall surfaces 63b and 63c are formed on the left and right with respect to the conveyance direction. The wall surfaces 63b and 63c function as guides for regulating the movement direction of the articles to be sorted, because of which each of articles 9a and 9b can be conveyed in a predetermined direction. On the right, side of the movable bench 6 in the figure, there is connected a container 95 in which the articles 9a and 9b are mixed together, and a case in which the articles 9a and 9b are fed on the movable bench 6 from the container 95 is illustrated. In addition, based on the instruction from the vibration switching means 32 in FIG. 1, the phase difference of vibrations in the Y direction is set to φ1 to φ2 or φ4 to φ5 shown in FIG. 7 by the vibration control means 31, and while the articles 9a and 9b in FIG. 9(a) are conveyed to the left direction of the figure, the articles are sorted toward the left-right wall surfaces 63b and 63c with respect to the proceeding direction until each article is conveyed while being in contact with the wall surfaces 63b and 63c. Thus, by easily performing sorting only by forming a conveyance path and wall surfaces, each article can be conveyed in a predetermined direction, which enables handling of articles of various sizes. If the sorting and conveyance of a specific article is to be performed in such a way, the vibration switching means 32 is not required, and simply setting the predetermined phase difference in the vibration control means 31 is sufficient.

In FIG. 9(b), a Y-shaped conveyance path 63a that bifurcates into an upper trajectory 64 and a lower trajectory 65 shown in the figure is formed on the movable bench 6, and two types of the articles 9a and 9b are conveyed from the right side to the left side by following the conveyance path 63a. Even in this case, in the vibration switching means 32 in FIG. 1, by switching the phase difference of vibrations in the Y direction to φ1 to φ2 or φ4 to φ5 shown in FIG. 7, the articles 9a and 9b in FIG. 9(a) receive Y-direction movement speed components of mutually opposite directions, and are conveyed while being in contact with the left-right wall surfaces 63b and 63c with respect to the conveyance direction. Thus, the conveyance destination can be altered when each article approaches the trajectories 64 and 65 from the Y-shaped point of bifurcation.

Furthermore, in FIG. 9(c), a straight conveyance path 63a is formed on the movable bench 6, which includes an extended trajectory 64, and trajectories 65a, 65b, and 65c that bifurcate sidewards with respect to the conveyance path 63a. By thus forming the device, normally, two types of the articles 9a and 9b can be conveyed in the same direction, and by adding a vibration component of the Y direction at a specific timing, the specific article 9b can be extracted in the bifurcated trajectories 65a, 65b, and 65c. Therefore, normally, both the articles 9a and 9b are conveyed in the left direction of the figure, and when the specific article 9b reaches any one of the lines 65a, 65b, or 65c where the article 9b must be conveyed, the vibrations can be switched by the vibration switching means 32 in FIG. 1, and the article 9b can be extracted from any of the bifurcated trajectories 65a, 65b, and 65c. In order to simplify the change in the conveyance direction during the conveyance of the article 9, the vibration switching means in FIG. 1 already stores internally the phase-difference data of the Y-direction vibrations with respect to the Z(K)-direction vibrations for conveying a plurality of articles 9 in the same direction, and the phase-difference data of the Y-direction vibrations with respect to the Z(K)-direction vibrations for sorting the plurality of articles 9 in the Y direction. In addition, by switching both phase differences upon receiving the input of a signal from the outside, which is not shown in the figure, switching can be performed such that the articles 9 that are proceeding in the same direction can be sorted and conveyed, and the articles 9 that are sorted and conveyed can be made to proceed in the same direction.

As described above, the article sorting and conveying device 1 according to the present embodiment has a movable bench 6 as a movable body provided on a substrate 4 through an elastic support means 5 such that articles 9 loaded on the movable bench 6 are conveyed by the vibrations of the movable bench 6, and the article sorting and conveying device 1 includes: a first vibration means 71 made of a piezoelectric element and imparting a periodic vibration force to the movable bench 6 in a direction inclined from a vertical direction; a second vibration means 72 made of a piezoelectric element and imparting a periodic vibration force to the movable bench 6 in a direction crossing the periodic vibration force by the first vibration means 71; and a vibration control means 31 that controls each vibration means 71 and 72 to cause the periodic vibration force imparted by each vibration means 71 and 72 to have a phase difference and occur simultaneously at the same frequency, and to create an elliptical vibration trajectory in the movable bench 6, wherein it is configured such that the articles 9 are sorted and conveyed on the movable bench 6 by setting the vibration trajectory of the movable bench 6 by the vibration control means 31 such that the articles 9 having a different coefficient of friction are conveyed in different directions.

Because the device is thus configured, the conveyance direction can be altered on the basis of the difference in the coefficient of friction while conveying the plurality of the articles 9 in one direction, and as a result, the articles 9 can be sorted automatically without using inspection equipment such as a camera and image processing apparatus, as well as special equipment, for sorting. In addition, because a conveyance surface 61 can be configured as a flat surface, articles ranging from a large size to a small size can be handled by a single device.

In addition, because guides 63b and 63c that move the sorted articles along a predetermined trajectory are provided on the movable bench 6, each of the plurality of articles can be conveyed in the predetermined direction while being sorted, and therefore, the device can be used favorably in a conveyance line such as a production line.

In addition, a vibration switching means 32 that switches the vibration trajectory of the movable bench 6 with a different vibration trajectory is provided, and the vibration switching means 32 is configured to internally store data of a phase difference according to which articles 9 having a different coefficient of friction are conveyed in a different direction, and data of a phase difference according to which articles 9 having a different coefficient of friction are conveyed in the same direction, which constitutes the phase difference of the periodic vibration force by each of the vibration means 71 and 72, and to switch the phase difference in accordance with a signal input from outside. Therefore, it is possible to easily switch between conveying a plurality of articles 9 in the same direction, and conveying each article 9 in a different direction by sorting into two directions.

Based on the first embodiment, the device can also be configured by modifying the first embodiment as described below.

For example, in the above-described first embodiment, the vibration means 71 and 72 for each direction are configured to impart an vibration force in the directions mutually perpendicular to K and Y, respectively, however, as long as vibration trajectories in which the vibration forces are combined together can be generated or changed in the movable bench 6, perpendicularity is not always necessary, and simply each of the directions may be crossing each other.

Furthermore, in the above-described first embodiment, the piezoelectric elements constitute a bimorph structure in which the first piezoelectric elements 71 and the second piezoelectric elements 72 attached on the side surfaces of the spring members 52 are provided in sets of two piezoelectric elements including those attached at the back and the front, however, as illustrated in FIG. 5(b), a unimorph structure with only a single piezoelectric element on each side is also possible.

Furthermore, in the present embodiment, as illustrated in FIG. 2 and FIG. 3, the first piezoelectric elements 71 and the second piezoelectric elements 72 are attached in the lower half of the spring members 52, however, it is possible to have a configuration in which the piezoelectric elements are attached in the upper half, or a configuration in which the piezoelectric elements are attached in the upper half as well as the lower half, respectively.

Figure 10:
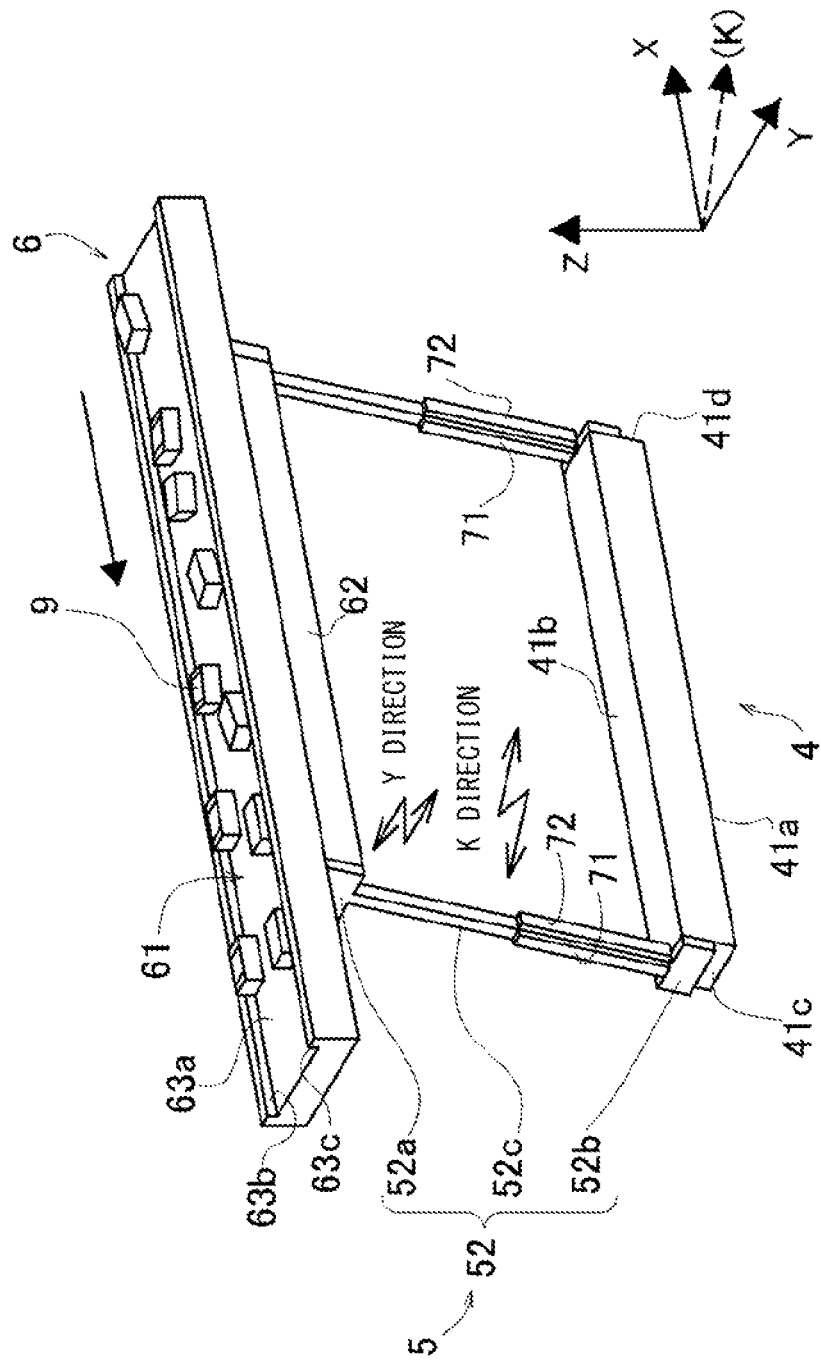
[FIG. 10]

Furthermore, in the above-described first embodiment, the elastic support means 5 is configured by four spring members 52, and this is to facilitate easy maintenance of the horizontal state of the movable bench 6. Therefore, when the vibration amplitude in the Y direction is small and the weight of the article 9 is little, then as illustrated in FIG. 10, it is possible to have a configuration in which two spring members 52 are provided in front and at the back with respect to the conveyance direction. In such a case, almost negligible amount of tilting occurs in the movable bench 6.

Figure 11:
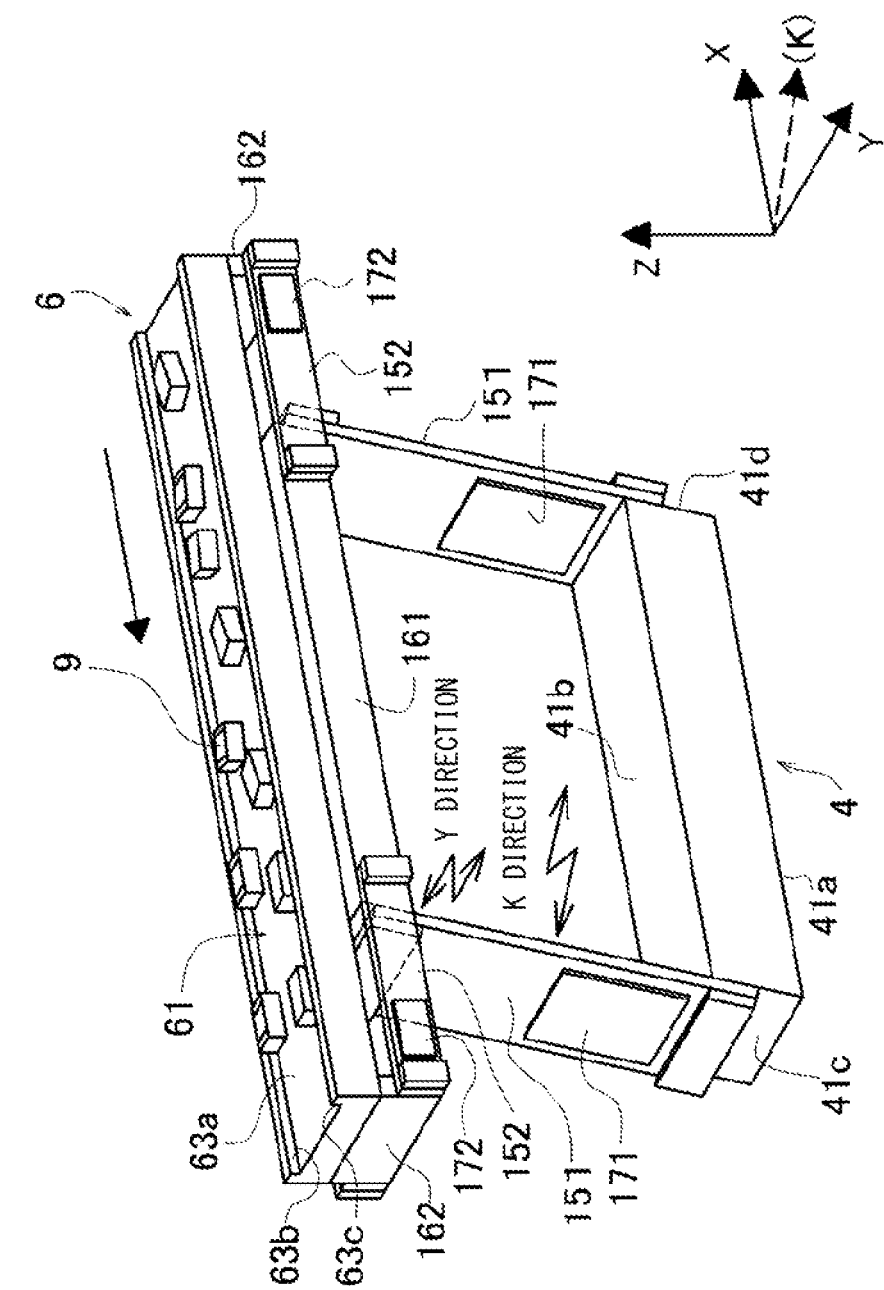
[FIG. 11]

Furthermore, instead of the rod-shaped spring members 52 of the above-described first embodiment, a configuration using a flat spring is illustrated in FIG. 11. In the present form, one end of each of a pair of flat springs 151 arranged perpendicular to the K direction as the K-direction spring members is provided relative to the substrate 4, and an intermediate bench 161 is supported by the other end. In addition, two sets of a pair of flat springs 152 and 152 arranged perpendicular to the Y direction as the Y-direction spring members are provided relative to the intermediate bench 161, and while a pair of blocks 162 and 162 are supported by the flat springs 152 and 152, the movable bench 6 is supported by the blocks 162 and 162. Also, piezoelectric elements 171 are attached to the flat springs 151 that are the K-direction spring members, and piezoelectric elements 172 are attached to the flat springs 152 that are the Y-direction spring members, and same as the above-described embodiment, by applying a control voltage to the piezoelectric elements 171 and 172, it is possible to impart vibrations in the K direction and the Y direction. Even in such a configuration, by performing control in the same way as described above, the same effect can be obtained, and each of the flat springs 151 and 152 in the K direction and the Y direction can be managed independently, because of which the maintenance task can be performed easily. In addition, it is also possible to have a configuration in which a plurality of flat springs are connected together and used, and in such a case maintenance is further simplified. Furthermore, by combining together the flat springs that are arranged in parallel, the occurrence of displacement in the torsional direction with respect to the movable bench 6 can be prevented, and operation can be performed while maintaining the tilt of the movable bench 6.

Figure 12:
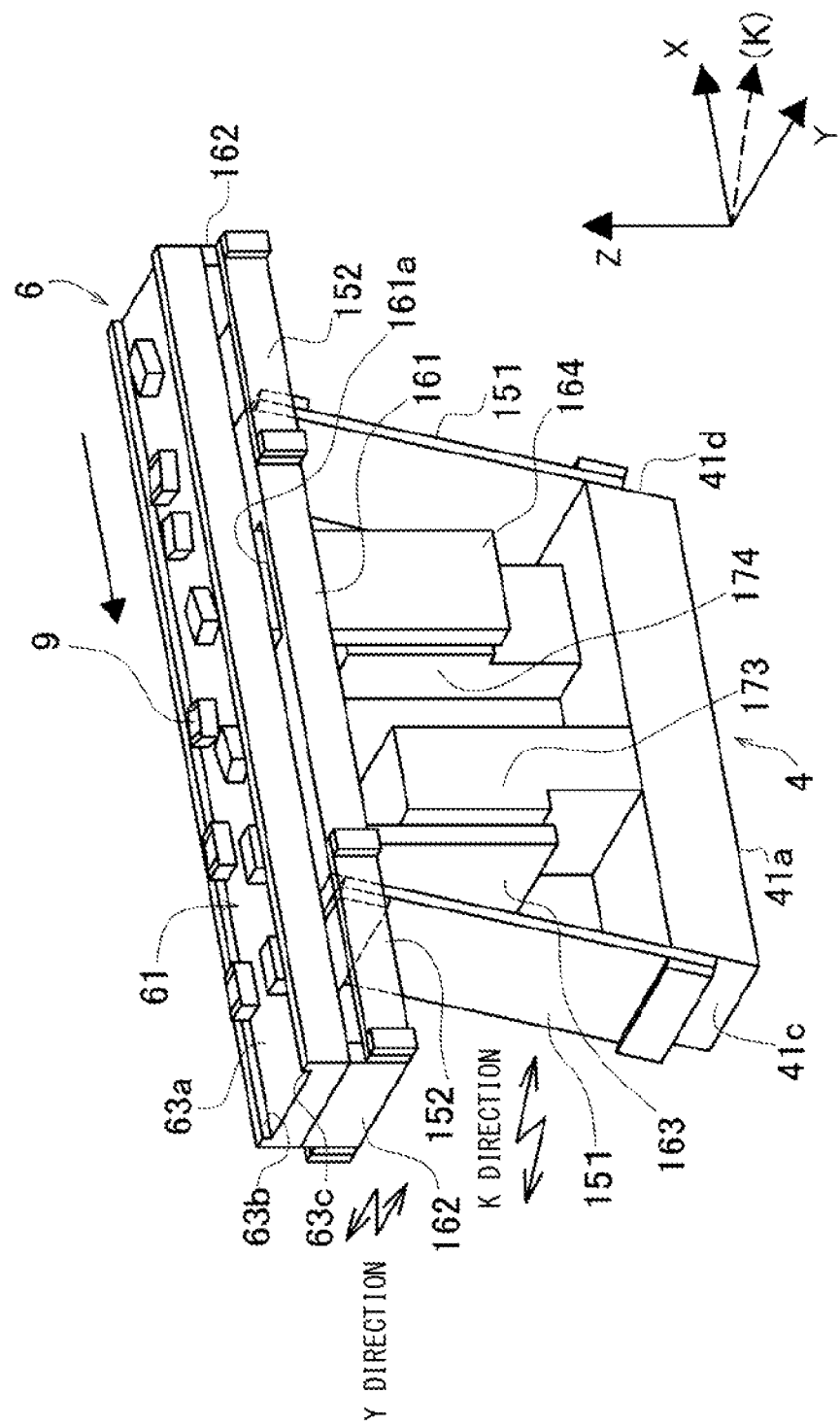
[FIG. 12]

Furthermore, another modification different from that described above is illustrated in FIG. 12. In the present modification, while the same flat spring configuration as illustrated in FIG. 11 is adopted, electromagnets 173 and 174 are used instead of the piezoelectric elements as the vibration means of the K direction and the Y direction. In such a case, while a magnetic metal plate 163 is provided on the lower surface of the intermediate bench 161, a magnetic metal plate 164 is provided on the lower surface of the movable bench 6. Because the metal plate 164 on the lower surface of the movable bench 6 bulges out in the downward direction by passing through an opening 161a provided in the intermediate bench 161, the metal plate does not interfere with the intermediate bench 161, and can be operated independently in the Y direction. The electromagnets 173 and 174 are provided on the substrate 4 so as to face the plates 163 and 164 that are thus provided, and by passing electric current in the electromagnets 173 and 174, the displacement in each of the K direction and the Y direction can be generated relative to the movable bench 6. Even in such a configuration, by controlling the current value in each direction, the same effect as above can be obtained, and a large output can be easily obtained in comparison with the case when the operation in the K direction and the Y direction is performed by piezoelectric elements.

<Second Embodiment>

Figure 13:
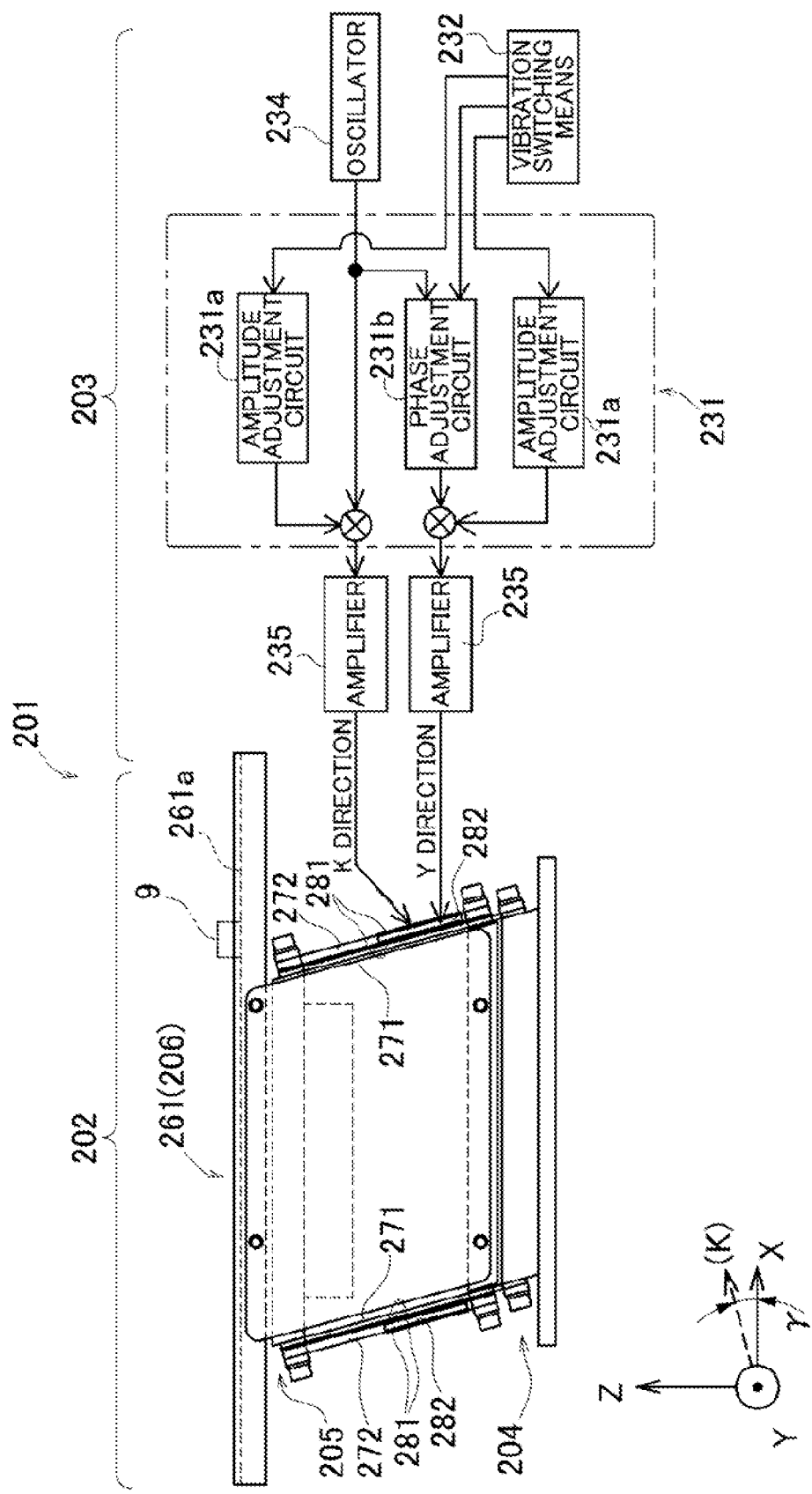
[FIG. 13]

An article sorting and conveying device 201 according to a second embodiment is configured mainly by a mechanical device unit 202 and a control system unit 203, as illustrated in FIG. 13. As described later, the control system unit 203 is configured to generate vibrations in the mechanical device unit 202 by imparting a periodic vibration force in each of the K and Y directions by controlling piezoelectric elements 281 to 282 that function as the vibration means and are incorporated in the mechanical device unit 202.

Also in the present embodiment, same as the above-described first embodiment the Y direction is the horizontal direction that is perpendicular to the paper surface in the figure, and the K direction is the direction perpendicular to the rod-shaped spring members 272 provided at an inclination from the vertical direction, and is perpendicular to the above Y direction. In addition, the X direction described later is the horizontal direction that is perpendicular to the above Y direction, and the Z direction is the vertical direction. In other words, each direction is defined as an axis of coordination as illustrated at the bottom left of the figure. Therefore, the K direction includes the components of the X direction and the Z direction, and is parallel to the XZ plane. Furthermore, as described later, the direction in which the rod-shaped spring members 272 rotate in a counterclockwise direction around the Y axis relative to the Z direction by as much as the rotation angle γ is set as the longitudinal direction. Therefore, the K axis indicating the K direction is the direction of rotation with respect to the X axis by as much as the rotation angle γ. Hereinafter, the explanation will be continued based on the axis of coordinates defined above.

Figure 14:
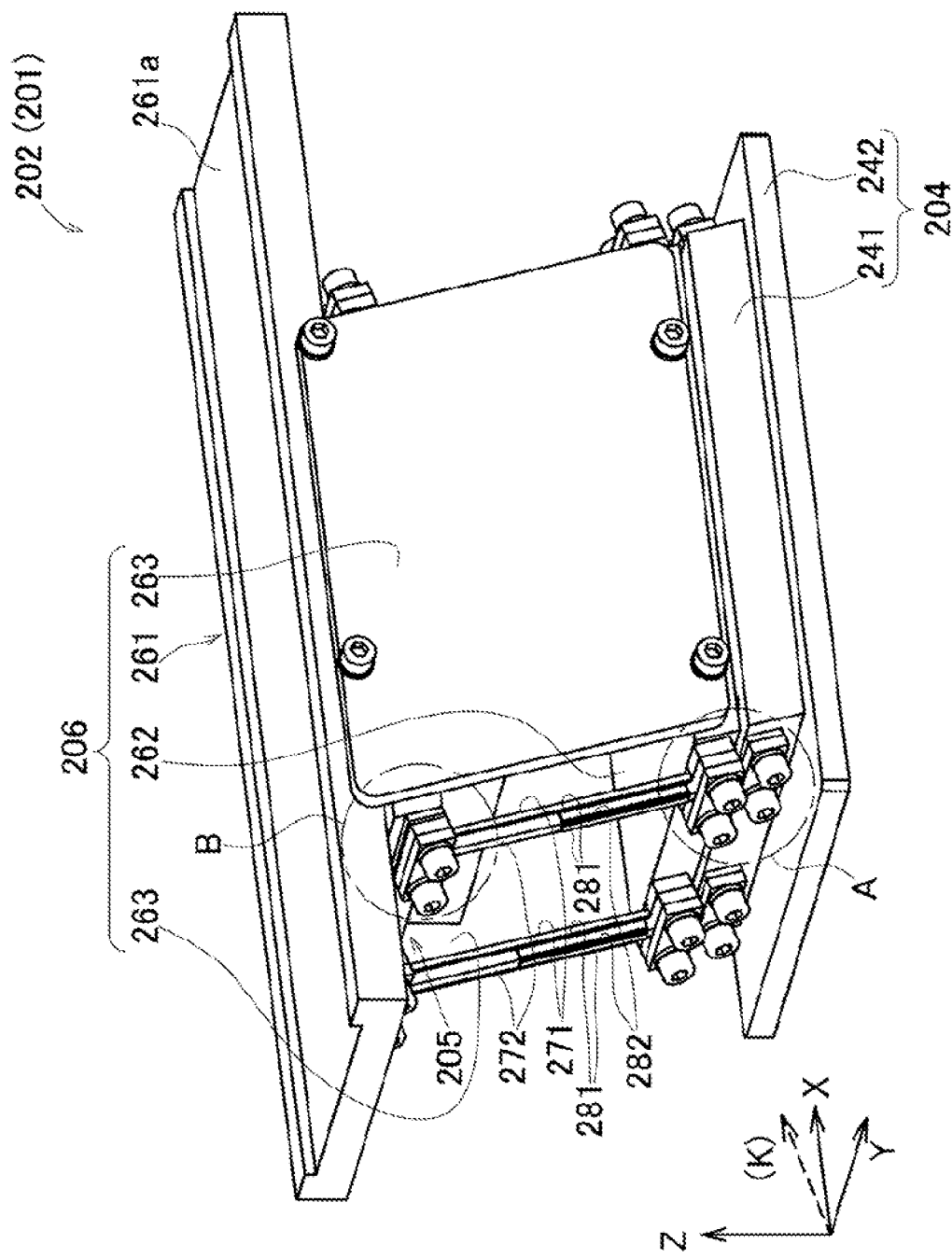
[FIG. 14]
Figure 15:
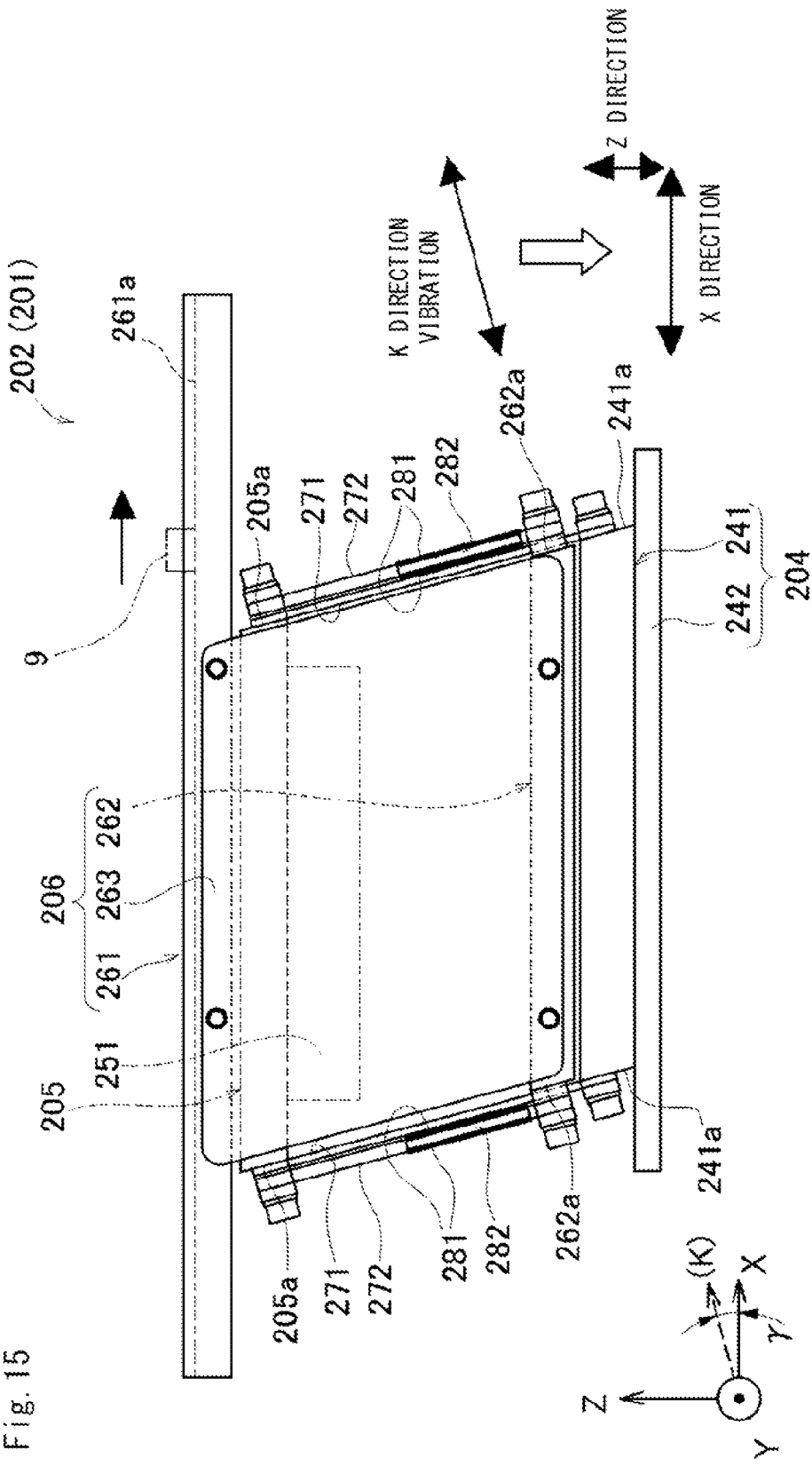
[FIG. 15]

As illustrated in FIG. 14 and FIG. 15, the mechanical device unit 202 is configured mainly by a base 204 that functions as a substrate installed on a floor, an intermediate bench 205 that is elastically supported by first rod-shaped spring members 271 to 271 relative to the base 204, and a movable body 206 that is elastically supported by second rod-shaped spring members 272 and 272 relative to the intermediate bench 205. A conveyance surface 261a is formed on top of the movable body 206 on which an article 9 for which sorting and conveyance is to be performed can be loaded.

The base 204 is configured by a rectangular base plate 242 of which the longitudinal direction is arranged toward the X direction, and a base block 241 affixed on top of the base plate 242. Same as the base plate 242, the base block 241 has an almost rectangular parallelepiped shape of which the longitudinal direction is arranged toward the X direction, and each of the front surface and the back surface as seen from the X direction fore and aft are provided as spring installation surfaces 241a and 241a for connecting the first rod-shaped spring members 271, and are formed as plane surfaces inclined with respect to the Z direction at an angle γ.

Same as the above-described base block 241, the intermediate bench 205 has an almost rectangular parallelepiped shape of which the longitudinal direction is arranged toward the X direction, and each of the front surface and the back surface as seen from the X direction fore and aft are provided as spring installation surfaces 205a and 205a for connecting the first rod-shaped spring members 271, and are formed as plane surfaces inclined with respect to the Z direction at an angle γ. Furthermore, the size between the spring installation surfaces 205a and 205a is set to be same as the size between the spring installation surfaces 241a and 241a in the above base block 241.

The intermediate bench 205 is arranged on top of the above-described base block 241 so as to be almost parallel to the base block 241, and while the spring installation surfaces 205a of the intermediate bench 205 and the spring installation surfaces 241a of the base block 241 are arranged to be parallel to each other, each of the spring installation surfaces 205a and the spring installation surfaces 241a are connected through two first rod-shaped spring members 271 and 271. As the first rod-shaped spring members 271 and 271 are arranged along the spring installation surfaces 241a and 205a, same as the tilting in the spring installation surfaces, the first rod-shaped spring members 271 and 271 are arranged at an inclination of angle γ with respect to the Z axis. Thus, the intermediate bench 205 is elastically supported relative to the base block 241 by a total of four first rod-shaped spring members 271 to 271 provided parallel to each other while having an inclination with respect to the Z direction.

Furthermore, as described later, an auxiliary weight 251 is provided on the lower surface of the intermediate bench 205 in order to adjust the mass and the center of gravity of the intermediate bench 205.

A lower movable bench 262 that configures a part of the movable body 206 is arranged downward of the intermediate bench 205 and upward of the base block 241. Same as the above-described base block 241 and the intermediate bench 205, the lower movable bench 262 has an almost rectangular solid shape of which the longitudinal direction is arranged toward the X direction, and each of the front surface and the back surface as seen from the X direction fore and aft is provided as the spring installation surfaces 262a and 262a for connecting the second rod-shaped spring members 272 described later, and are formed as plane surfaces inclined with respect to the Z direction at an angle γ. In addition, in order to avoid interference of the lower movable bench 262 with the above-described first rod-shaped spring members 271, the size between the spring installation surfaces 262a and 262a is set to be slightly smaller than the size between the spring installation surfaces 241a and 241a in the base block 241, and the size between the spring installation surfaces 205a and 205a in the intermediate bench 205.

Each of the spring installation surfaces 262a of the lower movable bench 262 and the spring installation surfaces 205a of the intermediate bench 205 are arranged to be parallel to each other, and are connected to each other through two second rod-shaped spring members 272 and 272 while sandwiching a spacer that is described later. As the second rod-shaped spring members 272 and 272 are arranged along the spring installation surfaces 262a and 205a, same as the tilting in the spring installation surfaces, the second rod-shaped spring members are arranged at an inclination of angle γ with respect to the Z axis. Thus, the lower movable bench 262 is configured to be elastically supported relative to the intermediate bench 205 by a total of four second rod-shaped spring members 272 to 272 provided parallel to each other while having an inclination with respect to the Z direction. By thus configuring, a relationship in which the second rod-shaped spring members 272 to 272 are arranged parallel to the first rod-shaped spring members 271 to 271 is seen.

Upward of the intermediate bench 205, there is provided a conveyance bench 261 that is parallel to the intermediate bench 205. The conveyance bench 261 is formed in a substantially plate shape so as to extend in the X direction, and the upper surface of the conveyance bench 261 is formed as a conveyance surface 261a for loading the articles 9. As described later, the conveyance surface 261a can be formed to have various configurations depending on the type and shape of the article 9 to be conveyed, and the direction of sorting and conveyance.

The conveyance bench 261 is formed to have the same size as the lower movable bench 262, in the Y direction, and the conveyance bench 261 and the lower movable bench 262 are connected via a pair of connecting members 263 and 263 provided so as to sandwich each side surface from both sides. The conveyance bench 261, the lower movable bench 262, and the connecting member 263 configure a single movable body 206 and operate as one unit.

Figure 16:
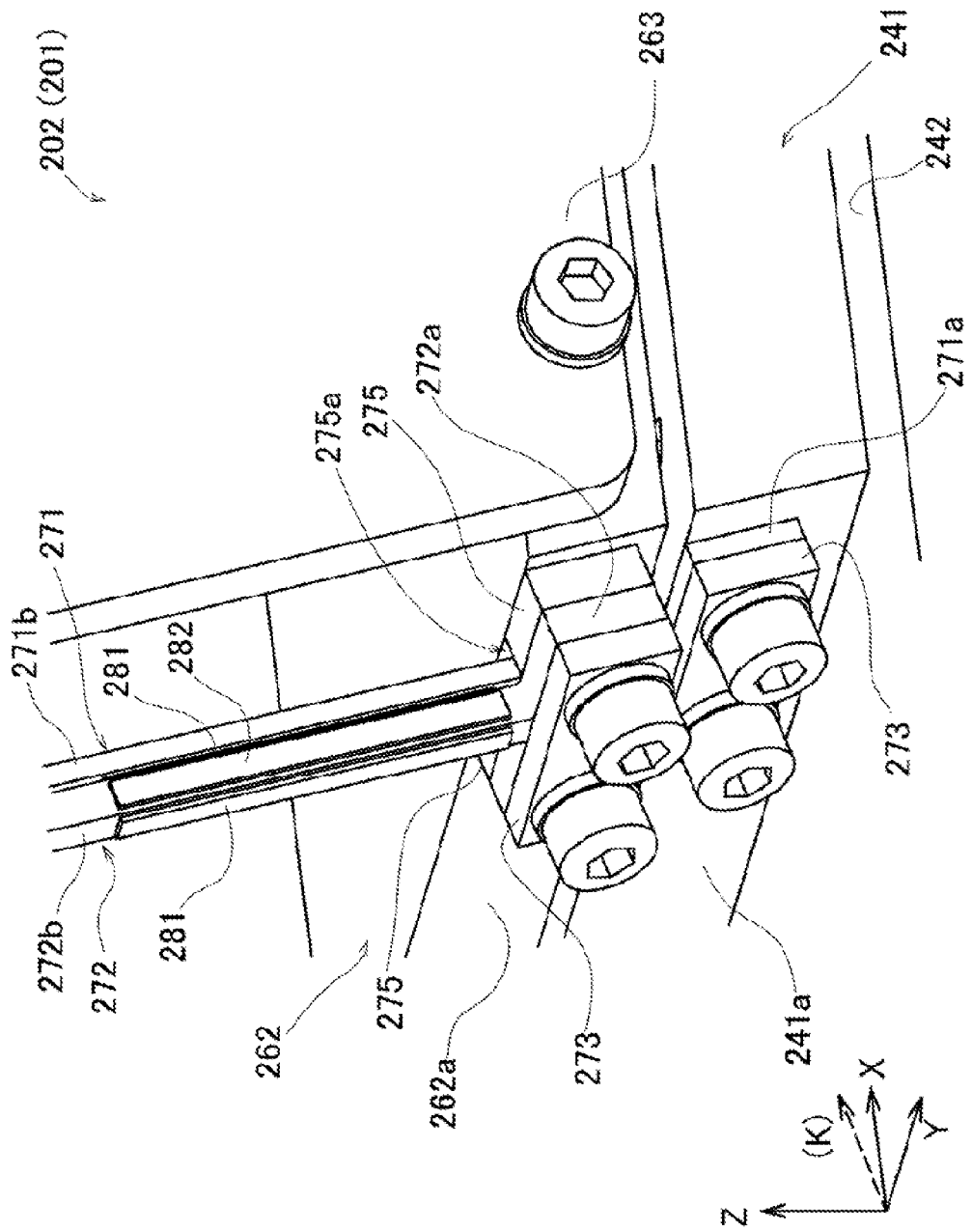
[FIG. 16]
Figure 17:
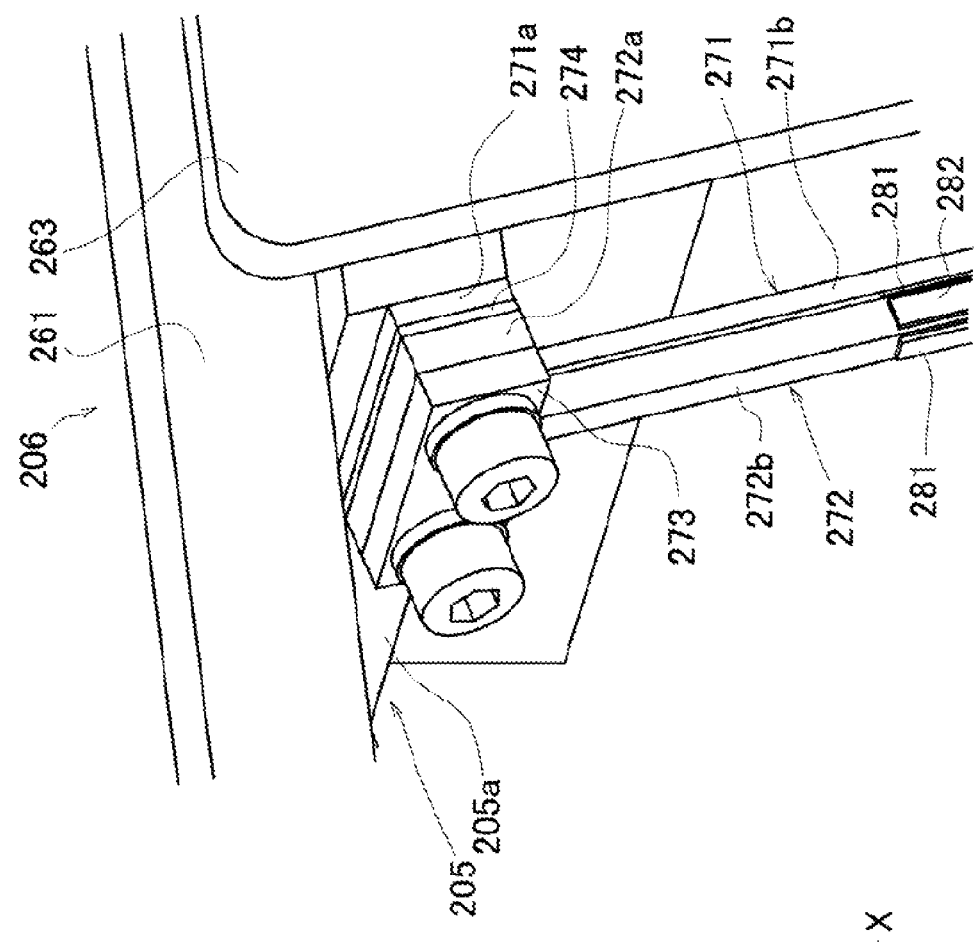
[FIG. 17]

The installation structure of the above-described first rod-shaped spring members 271 to 271 and the second rod-shaped spring members 272 to 272 is described in detail based on FIG. 16 and FIG. 17. First of all, FIG. 16 is an expanded view of a part. A and the surrounding portion thereof in FIG. 14.

Each of the first rod-shaped spring members 271 and the second rod-shaped spring members 272 is formed in the shape of letter I, and rectangular flat units 271a and 272a are formed at the upper end and the lower end thereof. Also, the rest of the portion is set as spring units 271b and 272b functioning as a spring, and in the planar view that is perpendicular to the longitudinal direction, the spring units 271b and 272.b have an almost square rectangular cross-section. Thus, the spring units 271b and 272b are formed in a rectangular parallelepiped shape, and among the side surfaces thereof, the two surfaces that are back to back are configured to be connected to each of the front surface and back surface forming the above-described flat units 271a and 272a. Based on such a configuration, the first rod-shaped spring members 271 and the second rod-shaped spring members 272 are set such that the spring units 271b and 272h bend easily with respect to two directions that are a first direction being perpendicular to the flat units 271a and 272a and a second direction being perpendicular to the first direction and also parallel to the flat units 271a and 272a.

The first rod-shaped spring members 271 and the second rod-shaped spring members 272 that have a bending directional characteristic as described above are installed in the below-described manner.

First of all, the flat unit 271a of the first rod-shaped spring member 271 is screwed onto the spring installation surface 241a of the base block 241 through a spring holder 273. A pair of rectangular plate-like spacers 275 and 275 are arranged so as to sandwich the spring unit 271b of the first rod-shaped spring member 271 from both sides in the Y direction. The flat unit 272a of the second rod-shaped spring member 272 is arranged to sandwich the above rectangular plate-like spacers 275 and 275, and the flat unit 272a is screwed onto the spring installation surface 262a of the lower movable bench 262, which is arranged immediately above and close to the base block 241, through the spring holder 273.

The spacers 275 and 275 are formed to be thicker than the spring unit 271b of the first rod-shaped spring member 271, and are arranged to be isolated from the spring unit 271b.

Based on such a configuration, the second rod-shaped spring member 272 is arranged on an outer side of the first rod-shaped spring member 271 to be parallel therewith, and a space is formed between the two. Furthermore, the spring unit 271b of the first rod-shaped spring member 271 is positioned inside an opening 275a formed between the above-described rectangular plate-like spacers 275 and 275 because of which there is no interference from the side of the lower movable bench 262, and therefore, the support status of the intermediate bench 205 (see FIG. 17) can be maintained independently. In the article sorting and conveying device 201 of the present embodiment, in order to enable the conveyance of the article 9 by slight vibrations, the setting that the vibration amplitude of the lower movable bench 262 is 1 mm or less is sufficient, and the clearance between the inner side of the above opening 275a and the spring unit 271b of the first rod-shaped spring member 271 may be sufficiently set to a small value of approximately 1 mm with respect to each of the K direction and Y direction.

In addition, the upper end of the first rod-shaped spring member 271 and the second rod-shaped spring member 272 is connected to each unit as illustrated in FIG. 17. FIG. 17 is an expanded view of a part. B and the surrounding portion thereof in FIG. 14.

The upper flat unit 271a of the first rod-shaped spring member 271, the rectangular plate-like spacer 274, and the upper flat unit 272a of the second rod-shaped spring member 272 are superposed and screwed onto the spring installation surface 205a of the intermediate bench 205 through the spring holder 273. The thickness of the spacer 274 is set such that the above-described relationship in which the second rod-shaped spring member 272 is arranged on an outer side of the first rod-shaped spring member 271 parallel thereto holds true.

By thus connecting, it is configured such that the intermediate bench 205 is elastically supported by the base block 241 (see FIG. 14) through the first rod-shaped spring member 271, and the intermediate bench 205 elastically supports the movable body 206 (see FIG. 14) through the second rod-shaped spring member 272.

Furthermore, each of the first rod-shaped spring members 271 and the second rod-shaped spring members 272 is arranged such that the spring units 271b and 272b are inclined at an angle of γ from the Z axis, and the direction of each side surface of the spring units 271b and 272b is perpendicular to the K direction or the Y direction. That is, the first rod-shaped spring members 271 and the second rod-shaped spring members 272 have the characteristic of bending at the side of the K direction that is the first direction, and at the side of the Y direction that is the second direction, as the bending directional characteristic described above. Therefore, each of the first rod-shaped spring members 271 and the second rod-shaped spring members 272 function as an elastic support means that perform elastic support relative, mainly, to the K direction and Y direction.

Further explanation is provided regarding such an elastically supporting structure between each member by using the schematic view shown in FIG. 18.

FIG. 18(a) expresses a simple model of the above mechanical device unit 202. In order to understand the correspondence relationship with the actual members, the symbol assigned to each constituent element configuring the model is obtained by adding "m" to the symbols used in FIG. 14 through FIG. 17. That is, the concept of providing an explanation by using a model is applicable in the same manner to the actual mechanical device unit 202.

As understood from the model, an intermediate bench 205m is arranged upward of a base 204m, and the intermediate bench 205m is elastically supported relative to the base 204m through first rod-shaped spring members 271m. In addition, a lower movable bench 262m is arranged downward of the intermediate bench 205m and upward of the base 204m, and the lower movable bench 262m is elastically supported relative to the intermediate bench 205m through second rod-shaped spring members 272m. In addition, a movable body 206m is configured by arranging a conveyance bench 261m so as to sandwich the intermediate bench 205m, and by connecting with the lower movable bench 262m with a connecting member 263m so as to form one unit.

Along with the above configuration, the first rod-shaped spring member 271m and the second rod-shaped spring member 272m are arranged parallel to each other while forming a gap therebetween. In this way, the two rod-shaped spring members can be displaced independently without interfering with each other. Furthermore, the positional relationship of the intermediate bench 205m and the movable body 206m is configured such that a center of gravity 205g of the intermediate bench 205m and a center of gravity 200g of the movable body 206m are at almost the same position. The almost same position indicates that the position is almost the same with respect to each of the X, Y, and Z directions.

The movable body 206m is formed in an enclosed shape encircling the intermediate bench 205m, and is configured by the lower movable bench 262m arranged downward of the intermediate bench 205m, the conveyance bench 261m arranged upward of the intermediate bench 205m, and the connecting member 263m (and 263m) that connects the lower movable bench 262m and the conveyance bench 261m, and therefore, it is possible to have a device configuration in which the centers of gravity 205g and 206g of both the movable body and the intermediate bench are easily set at almost the same position. In addition, in order to adjust the center of gravity in an auxiliary manner, the auxiliary weight 251 is attached downward of the intermediate bench 205 as shown in FIG. 15 such that the center of gravity 205g can be easily adjusted by adjusting the position and weight of the auxiliary weight 251. In this way, even when the weight of the article 9, which is loaded for changing the shape of each member and for adding components or for sorting and conveyance, changes immensely, the articles can be handled easily.

A model that further simplifies the above-described model is illustrated in FIG. 18(b). In order to understand the correspondence relationship with the actual members, the symbol assigned to each constituent element configuring the model is obtained by adding "M" to the symbols used in FIG. 14 through 17.

Thus, the model can be perceived as one in which a mass body 205M that acts as the intermediate bench is elastically supported by a spring 271M relative to a base 204M that acts as a fixed surface, and a mass body 206M is arranged as a movable body to enclose the outer side of the mass body 205M, and the mass body 206M is elastically supported by a spring 272M relative to the mass body 205M. The mass body 206M is configured by a lower fixed bench 262M, a conveyance bench 261M, and connecting members 263M and 263M that connect the lower fixed bench and the conveyance bench, and a center of gravity 206G of the mass body 206M is configured to be at almost the same position as a center of gravity 205G of the mass body 205M that functions as the intermediate bench.

Thus, when a relative force acts between the mass body 205M and the movable body 206M in the same direction as the spring 272M, both perform elastic displacement in the opposite phase. By imparting a vibration force in such a direction through the use of the vibration means described later, vibrations can be generated in the above-described form of opposite phase. Vibrations having a form of opposite phase refers to vibrations of a form in which when the mass body 205M is, for example, displaced in the downward direction of the figure, the mass body 206M is displaced in the opposite upward direction, and when the mass body 205M is displaced in the upward direction of the figure, the mass body 206M is displaced in the opposite downward direction. Such a form of vibrations can be efficiently generated at a natural frequency in the opposite phase form (a so-called opposite phase mode), and the natural frequency depends on a mass $m_1$ of the mass body 205M, a mass $m_2$ of the mass body 206M, a spring constant $k_1$ of the spring 272M, and the spring constant $k_2$ of the spring 271M. In order to be able to efficiently achieve vibrations of such a form, it is preferable to set the spring constant $k_2$ of the spring 271M to approximately 1/10 of the spring constant $k_1$ of the spring 272M.

In addition, in the model illustrated in FIG. 18(b), the displacement direction of the spring is the Z direction, however, according to the actual structure, as in the case of the model shown in FIG. 18(a) that is closer to the actual machine, actually elastic support is performed relative to the K direction and the Y direction, and therefore, the elastic support direction is different from the Z direction, due to which rather than one direction, elastic displacement occurs independently in two directions, and vibrations can be generated in the opposite phase mode. In other words, the material, cross-sectional profile, and length are adjusted such that the spring constant of each rod-shaped spring member 271m and 272m is set relative to the K direction and the Y direction, respectively, and the spring constant of the first rod-shaped spring member 271m is set to approximately 1/10 of the spring constant of the second rod-shaped spring member 272m, with respect to each direction. Furthermore, the natural frequency in the opposite phase mode of the K direction and the Z direction is set slightly apart to avoid resonance.

In addition, coming back to FIG. 18(a), because the centers of gravity 205g and 206g of the intermediate bench 205m and the movable body 206m that perform vibrations in mutually opposite phases are almost at the same position, when the intermediate bench 205m and the movable body 206m are displaced in each direction in accordance with the vibration force, the centers of gravity 205g and 206g of the both move on the same straight line facing the direction of vibration, because of which the turning moment is not generated. Therefore, it is possible for the conveyance bench 261m and the intermediate bench 205m to move parallel to each other in the K direction and the Y direction while maintaining the same form, without any tilting and swinging.

In addition, in spite of the fact that vibrations in mutually opposite phases are generated in the intermediate bench 205m and the movable body 206m, the centers of gravity retain the same location on an overall basis, because of which the counterforce generated as a result of the operation of the intermediate bench 205m and the movable body 206m is almost negligible in the base 204m. Therefore, the installation environment can also be maintained favorably without the transmission of unnecessary force and vibrations from the has 204m to the installation surface.

As shown above, in order to simplify the explanation, the explanation was provided by using the models illustrated in FIG. 18(a) and FIG. 18 (b), however, the actual mechanical device unit 2 illustrated in FIG. 14 is configured on the basis of the same concept.

As illustrated in FIG. 14, the mechanical device unit 202 according to the present embodiment generates vibrations in the opposite phase form in each of the K and Y directions relative to the movable body 206 and the intermediate bench 205, and therefore, as described below, piezoelectric elements 281 to 282 are provided as the vibration means that imparts the above-described vibration force.

First of all, as a first vibration means that imparts vibrations in the K direction, the rectangular parallelepiped first piezoelectric elements 281 are attached on the surface perpendicular to the K axis at the side surfaces below the center of the longitudinal direction of the spring unit 272b of the second rod-shaped spring members 272. Moreover, as a second vibration means that imparts vibrations in the Y direction, the rectangular parallelepiped second piezoelectric elements 282 are attached on the surface perpendicular to the Y axis at the side surfaces below the center of the longitudinal direction of the spring unit 272b of the second rod-shaped spring members 272. Through the impression of voltage, the piezoelectric elements 281 to 282 can be elongated in the entire length, and therefore, as shown in FIG. 19 as an example, it is possible to bend the second rod-shaped spring members 272 and produce a displacement in the movable body 206 in the K direction or the Y direction.

Figure 19:
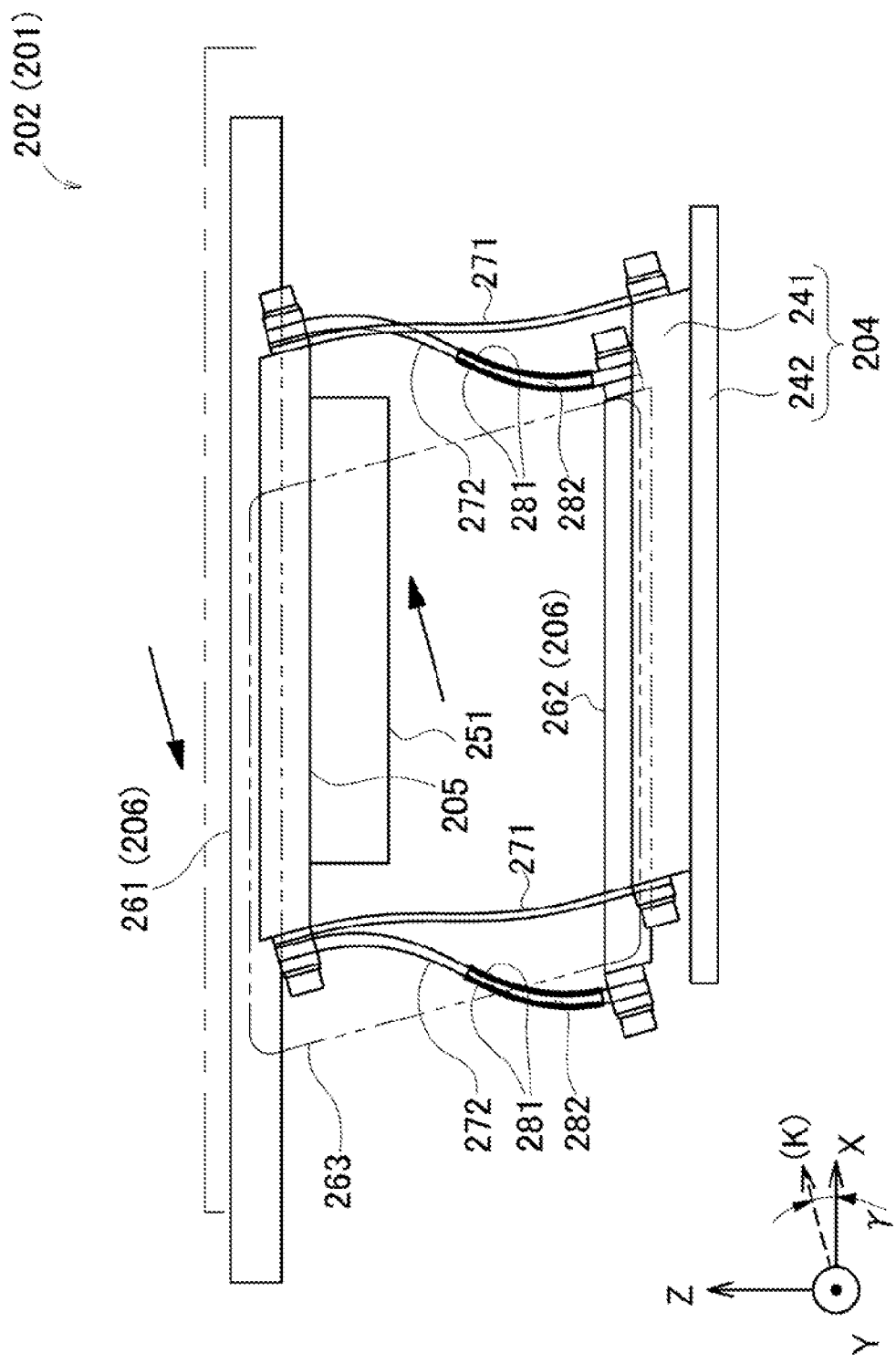
[FIG. 19]

In order to easily understand the displacement, some portions in FIG. 19 are exaggerated and shown, and because the actual displacement is set to 1 mm or below as described above, there is no interference between each unit as shown in the figure. Furthermore, in the present figure, the connecting member 263 has been removed, but it is assumed that the movable body 206 does not lose its identity as a single unit.

In the present figure, as an example of elastic displacement, bending occurs in the second spring members 272 by the action of the first piezoelectric elements 281, and as a result of this action, the intermediate bench 205 is displaced relative to the K direction positive side (upper right direction in the figure). Also, as a result of the counterforce, the movable body 206 is displaced relative to the K direction negative side (lower left direction in the figure). Thus, with the neutral position during non-operation as the base point, the intermediate bench 205 and the movable body 206 are displaced to be set in mutually opposite directions. Furthermore, the entire intermediate bench 205 and the movable body 206 are supported relative to the base 204 by the first rod-shaped spring members 271 of which the spring constant is set sufficiently low at approximately 1/10 of the second rod-shaped spring members 272, and therefore, the first rod-shaped spring members 271 function as a spring vibration isolator and flexibly support the intermediate bench 205 and the movable body 206. In this way, the counterforce resulting from the operation of the intermediate bench 205 and the movable body 206 is not transmitted to the base 204, and the support status can be maintained in a stable manner relative to the installation surface. Furthermore, the above-described relationship between elastic displacement and support is configured not only in the K direction, but also in the Y direction, in a similar manner.

In the present embodiment, as illustrated in FIG. 20(a), the piezoelectric elements are configured as a bimorph type with each of the first piezoelectric elements 281 and 281 and the second piezoelectric elements 282 and 282 provided in pairs in the opposing surfaces on the spring unit 272b of each second rod-shaped spring member 272. As in the present embodiment, when the second rod-shaped spring members 272 are bent by using the elongation of the piezoelectric elements, then if one of the piezoelectric elements provided on opposing surfaces is set in the elongation side, the other piezoelectric element must be set in the constriction side, and therefore, when one side is considered as the elongation side, the voltage impression and attaching direction are set so that the other side becomes the constriction side. Hereinafter, with regard to the voltage applied to the piezoelectric elements, a simple explanation is provided as the K-direction control voltage and the Y-direction control voltage, and the impression of a positive control voltage in the K direction and the Y direction indicates the impression of a voltage for elongating and constricting the first piezoelectric elements 281 and the second piezoelectric elements 282 so as to bend the second rod-shaped spring members 272 toward the direction of movement of the movable body 206 in each of the positive K and Y directions.

Furthermore, in order to bring about a deformation in the spring member 272b, the elongation side and the constriction side are reversed between the top and the bottom in one surface, with the center of the longitudinal direction as the boundary, as shown in FIG. 19. Thus, the attachment of the first piezoelectric elements 281 and the second piezoelectric elements 282 in a wide range that is in excess of the surrounding of the center of the longitudinal direction obstructs the deformation on the contrary, which is not preferable. Therefore, as in the present embodiment, it is more efficient to attach the piezoelectric elements at a position closer to one end from near the center of the longitudinal direction.

By applying sinusoidal control voltage to each of the first piezoelectric elements 281 and the second piezoelectric elements 282, the control system unit 203 generates a periodic vibration force for generating vibrations in each of the K and Y directions in the mechanical device unit 202 that is configured as described above.

Therefore, as illustrated in FIG. 13, the control system unit 203 includes an oscillator 234 for generating sinusoidal voltage, and the sinusoidal voltage is output to each piezoelectric element 281 to 282 after being amplified by an amplifier 235. In addition, the control system unit 203 includes a vibration control means 231 for making detailed adjustment of the control voltage in each of the K and Y directions. It must be noted that by setting the frequency of the vibrations generated by the oscillator 234 as the frequency resonating with the vibration system of either of the K or Y directions, electric power is saved by amplifying the vibrations. In order to avoid the vibrations of both vibration systems from interfering with each other, the natural frequency of each direction may be separated as described above. At this time, the natural frequency in each direction may be separated by approximately −10% to +10%, for example.

The vibration control means 231 is configured mainly by an amplitude adjustment circuit 231a for adjusting the amplitude of the control voltage in each of the K and Y directions, and a phase adjustment circuit 231b for adjusting each phase difference. In the present embodiment, it is configured such that the amplitude adjustment circuit 231a corresponding to each of the control voltages of K and Y is present, and a phase adjustment circuit 231b that adjusts the phase of the control voltage with reference to the phase of the control voltage in the K direction so as to result in a predetermined phase difference from the phase of the control voltage in the K direction is provided for the control voltage of the Y direction.

Moreover, in order to obtain a conveyance direction and a conveyance speed in accordance with the article 9 to be conveyed, the control system unit 203 includes a vibration switching means 232 for switching the amplitude and phase of the control voltage applied to each piezoelectric element 281 to 282 that imparts a periodic vibration force in each direction. Based on a signal from outside, which is not shown in the figure, the vibration switching means 232 determines the specific control value of the amplitude and phase of the control voltage of each piezoelectric element 281 to 282 corresponding to a predetermined direction in order to appropriately change the conveyance direction of the article 9 to the predetermined direction, and sends an instruction to the amplitude adjustment circuit 231a and the phase adjustment circuit 231b to perform adjustment to the control value.

Same as in the ease of the first embodiment described above, the article sorting and conveying device 201 configured as described above specifically acts relative to the article 9 on the basis of the principle described below. In order to simplify the explanation, let the above-described vibration component of the K direction be disintegrated into vibrations in the X direction and the Z direction.

Figure 21:
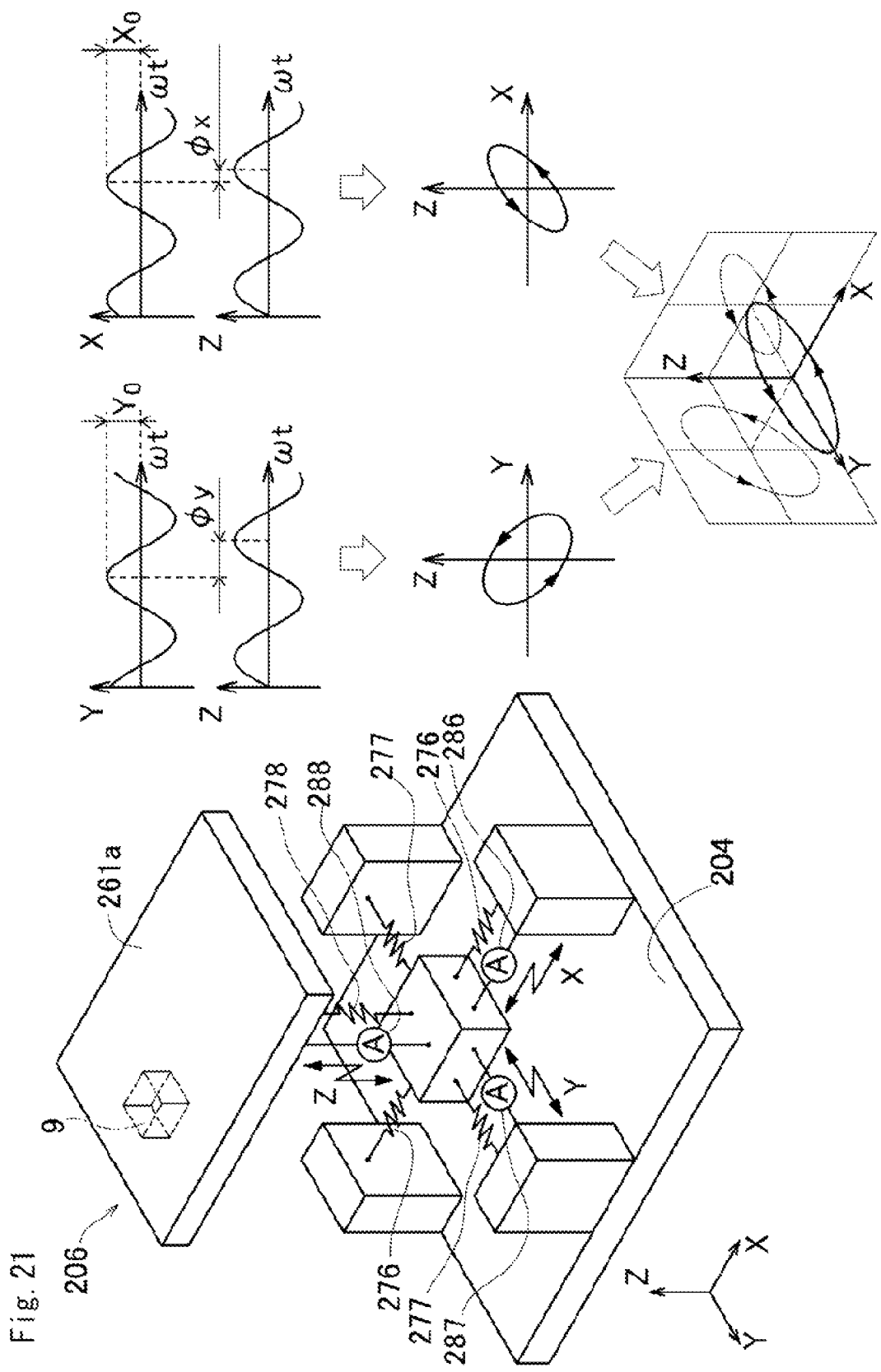
[FIG. 21]

Same as in the case of the first embodiment, a simplified model of the present article sorting and conveying device 201 as shown in the schematic view in FIG. 21 is assumed, and a case in which the movable body 206 is elastically supported by elastic bodies 276, 277, and 278 relative to the base 204 in each of the X, Y, and Z directions, and vibration means 286, 287, and 288 are provided for each direction, is considered. As a result of such a configuration, it is possible to operate the movable body 206 in three directions by the vibration means 286, 287, and 288 provided in the three directions, that is, X, Y, and Z directions. The elastic bodies 276, 277, and 278 in the schematic view in FIG. 21 correspond to the second rod-shaped spring members 272 in FIG. 13, and the vibration means 286, 287, and 288 in FIG. 21 correspond to each piezoelectric element 281 to 282.

A periodic vibration displacement expressed by $Z=Z_0 \times \sin\omega t$ is applied in the Z direction relative to the movable body 206 of the model illustrated in FIG. 21. $Z_0$ indicates the amplitude in the Z direction, $\omega$ indicates the angular frequency, and t indicates the time. In addition, also in each of the X and Y directions, vibrations having the same frequency as the Z direction are applied as indicated by the formulas $X=X_0 \times \sin(\omega t+\phi x)$, $Y=Y_0 \times \sin(\omega t+\phi y)$. $X_0$ and $Y_0$ indicate the amplitude in the X direction and the Y direction respectively, and $\phi x$ and $\phi y$ indicate the phase difference of the vibrations in the X direction and the Y direction respectively with respect to the vibrations in the Z direction.

By thus applying a sinusoidal periodic vibration displacement in each of the X, Y, and Z directions, vibrations having an elliptical trajectory in a plane that is inclined relative to the vertical plane and the horizontal plane, which is called a three-dimensional vibration trajectory in the present invention in which the periodic vibration displacements in the three directions are combined together, or vibrations having a solid trajectory outside the plane can be generated relative to the movable body 206. For example, as illustrated in FIG. 21, when vibrations are generated in the X and Y direction with providing a phase difference of $\phi x$ and $\phi y$ to the vibration component of the Z direction, vibrations having an elliptical trajectory with the right side on top are generated on the XZ plane in a two-dimensional manner, and vibrations having an elliptical trajectory with the right side at the bottom are generated on the YZ plane. In addition, by combining together the two vibrations, an elliptical trajectory on a three-dimensional space like a three-dimensional vibration trajectory is generated as illustrated at the bottom right of the figure.

Also, by changing the amplitude and phase of the vibration displacement in each direction, the size and direction of the two-dimensional elliptical trajectory in the XZ plane and the YZ plane can be changed, and in correspondence, the size and direction of the elliptical trajectory on the three-dimensional space can be changed freely. It must be noted that in order to thus impart the periodic vibration displacement in each direction, it is controlled that a periodic vibration force is imparted in each direction.

As described above, when the movable body 206 vibrates while tracing an elliptical trajectory, the article 9 loaded on top of the movable body 206 starts moving. Also, in this movement, the movement speed component in the X direction can be controlled by the elliptical trajectory in the XZ plane, and the movement speed component in the Y direction can be controlled by the elliptical trajectory in the YZ plane. That is, by changing the amplitude and the phase difference of the vibrations in each of the X direction and the Y direction with reference to the vibration component of the Z direction, the movement speed component in the X and Y direction can be changed and conveyance can be performed in any direction.

Specifically, the change in the movement speed component in each direction is performed as described below.

According to the knowledge of the inventors, if explanation is again provided by using FIG. 7 while referring to FIG. 21, as a result of the phase difference $\phi x$ ($\phi y$), the movement speed Vx (Vy) of the article 9 changes so as to trace a curve similar to a sinusoidal wave, and the movement speed also changes depending on the coefficient of friction between the article 9 and the movable body 206. In other words, when the coefficient of friction between two types of articles 9 indicated by W1 and W2 and the movable body 206 is $\mu 1$ and $\mu 2$ respectively, satisfying the relationship $\mu 1 < \mu 2$, the graph of the movement speed of W2 is the shape obtained by shifting the curve of the movement speed of W1 in a direction in which the phase difference becomes positive. Therefore, when articles 9 having different coefficients of friction are simultaneously kept on the movable body 206 for which elliptical vibration is to be performed, the movement speed and the direction of movement, are altered.

Specifically, when $\phi x$ is set as the phase difference of $\phi 1$ illustrated in FIG. 7, the X-direction movement speed of W1 becomes 0, and W2 takes a negative value. Also, when a phase difference is set between $\phi 1$ and $\phi 2$, W1 proceeds in a positive direction and W2 proceeds in a negative direction, which are mutually opposite directions. In the case of phase difference of φ2, the speed of W2 becomes 0, and W1 has the speed of the positive direction. In addition, between φ2 and φ4, both W1 and W2 proceed in the positive direction, and at φ3 therein, both W1 and W2 have the same speed, and at a point before and after φ3, the size of the speed of W1 and W2 is reversed. Furthermore, when the phase difference is φ4, the speed of W1 becomes 0, and W2 moves in the positive direction. In the range of the phase difference of φ4 to φ5, W1 proceeds in the negative direction, and W2 proceeds in the positive direction. In addition, at φ5, the speed of W2 becomes 0, and W1 proceeds in the negative direction. Furthermore, in the range of φ5 to π, both W1 and W2 proceed in the negative direction, however, within this range, both have the same speed at φ5, and the speed is reversed at the points before and after φ5. Such a relationship is applicable even for the movement speed Vy in the Y direction.

According to the knowledge of the inventors, if explanation is provided by using FIG. 8 while referring to FIG. 21, the relationship between the phase difference φx (φy) and the movement, speed Vx (Vy) of the article 9 changes also by changing the amplitude $X_0$ ($Y_0$). That is, the curve that is similar to a sinusoidal wave, which is the movement speed Vx (Vy) of the article 9 with respect to the phase difference φx (φy), generally changes in proportion to the amplitude $X_0$ ($Y_0$) of the vibration displacement. Therefore, when the movement speed Vx (Vy) of the article 9 is to be doubled, generally, the amplitude of the vibration displacement in the X (X) direction may be doubled. For achieving this, the amplitude of the control voltage may be changed in order to impart a corresponding vibration force.

By thus applying the vibration control for one direction simultaneously to the perpendicular X and Y directions, a plurality of types of articles 9 having different coefficients of friction can be sorted on the movable body 206, and can be conveyed in different directions. As described above, by performing control to convey articles 9 having different coefficients of friction in different directions, the conveyance direction can be altered even for articles that can be conceived as having apparently different coefficients of friction, such as different surface profile even when the coefficient of friction is strictly the same. For example, this holds true in a case where the same article has a top surface and a back surface, and the ruggedness of the surface is different, and the contact area with the movable body 206 is largely different between the two surfaces, and even in such a case, sorting and conveyance can be appropriately performed.

However, having three different vibration means in three directions, as described above, is not mandatory when the objective is to sort a plurality of types of articles 9 in two directions while conveying the articles 9. This is because as understood from FIG. 7, with regard to the X direction, when conveyance is to be performed only in one direction, and proceeding in the reverse direction is not necessary, the phase difference relative to the Z direction may be set to 0, that is, driving may be performed in the same phase. Thus, in the present embodiment, a single unit can be configured as the vibration means 281 (see FIG. 14) of the K direction that has the vibration components of the Z direction and the X direction.

In contrast, since it is necessary to have a function of performing sorting in accordance with the types of the article 9 in the Y direction, it is configured such that the switching of the phase difference relative to the periodic vibration force in the Z direction, that is the phase difference relative to the periodic vibration force of the K direction, in accordance with the coefficient of friction of the articles is enabled.

Figure 22:
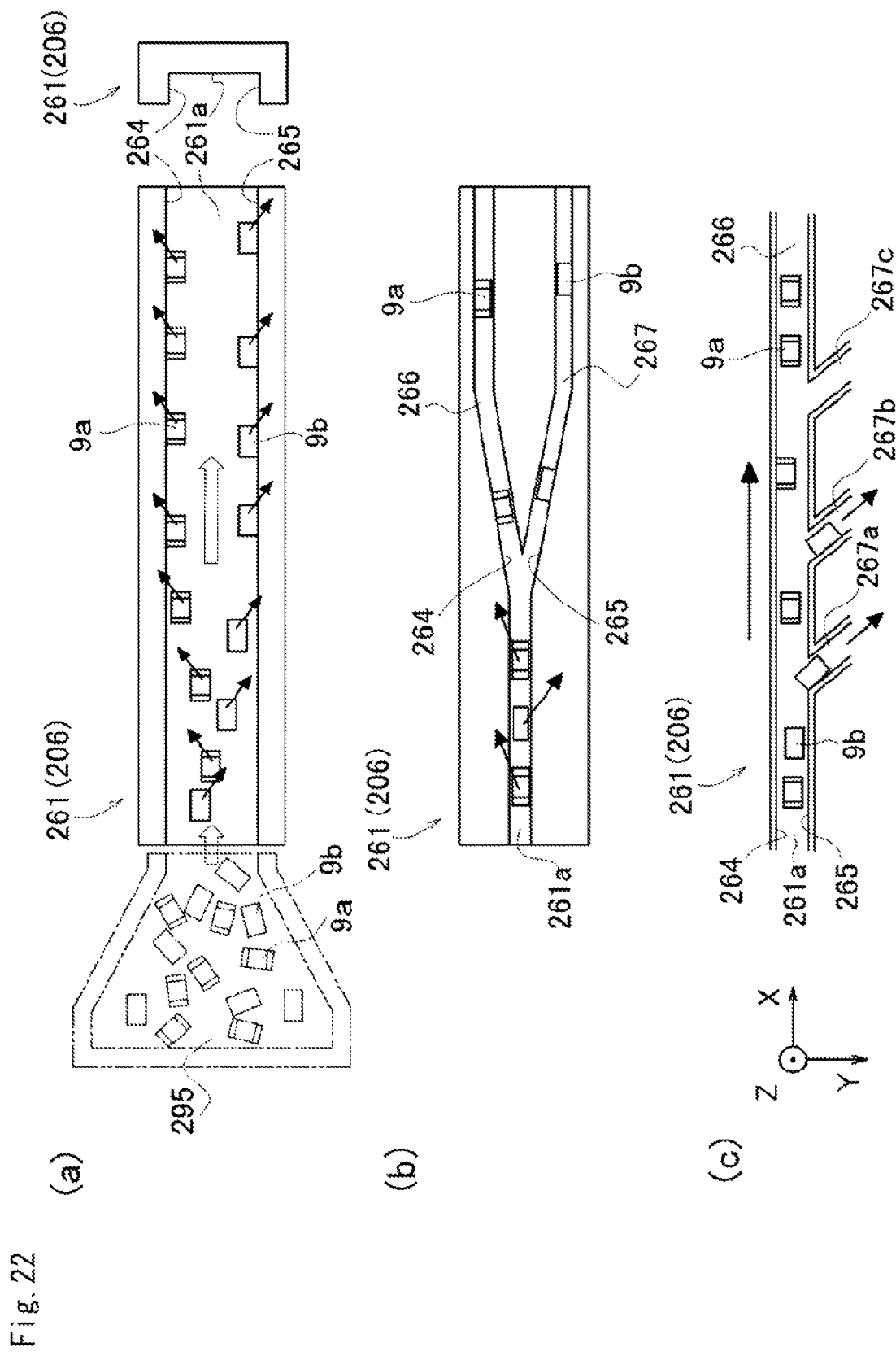
[FIG. 22] FIG. 22(a)-22(c) each is a top view illustrating a conveyance path in the article sorting and conveying device.

The present article sorting and conveying device 201 that is thus configured enables conveyance and sorting of the article 9, as illustrated in FIG. 22(a) through FIG. 22(c).

FIG. 22(a) is an example in which a wide conveyance path 261a is formed on the conveyance bench 261 that configures a part of the movable body 206, and parallel wall surfaces 264 and 265 are formed on the left and right with respect to the conveyance direction. The wall surfaces 264 and 265 function as guides for regulating the movement direction of the articles to be sorted, because of which each of the articles 9a and 9b can be conveyed in a predetermined direction. On the right side of the conveyance bench 261 in the figure, there is connected a container 295 in which the articles 9a and 9b are mixed together, and a case in which the articles 9a and 9b are fed on the conveyance bench 261 from the container 295 is illustrated. In addition, based on the instruction from the vibration switching means 232 in FIG. 13, the phase difference of vibrations in the Y direction is set to φ1 to φ2 or φ4 to φ5 shown in FIG. 7 by the vibration control means 231, and while the articles 9a and 9b in FIG. 22(a) are conveyed to the right direction of the figure, the articles 9a and 9b are sorted toward the left-right wall surfaces 264 and 265 with respect to the proceeding direction until each article is conveyed while being in contact with the wall surfaces 264 and 265. Thus, by easily performing sorting only by forming a conveyance path and wall surfaces, each article can be conveyed in a predetermined direction, which enables handling of articles of various sizes. If the only sorting and conveyance of a specific article is to be performed in such a way, the vibration switching means 232 is not required, and simply setting the predetermined phase difference in the vibration control means 231 is sufficient.

In FIG. 22(b), a Y-shaped conveyance path 261a that bifurcates into an upper trajectory 266 and a lower trajectory 267 shown in the figure is formed on the conveyance bench 261, and two types of the articles 9a and 9b are conveyed from the left side to the right side shown in the figure by following the conveyance path 261a. Also in this case, in the vibration switching means 232 in FIG. 13, by switching the phase difference of vibrations in the Y direction to φ1 to φ2 or φ4 to φ5 shown in FIG. 7, the articles 9a and 9b in FIG. 22(a) receive Y-direction movement speed components of mutually opposite directions, and are conveyed while being in contact with the left-right wall surfaces 264 and 265 with respect to the conveyance direction. Thus, the conveyance destination can be altered when each article approaches the trajectories 266 and 267 from the Y-shaped point of bifurcation.

Furthermore, in FIG. 22(c), the straight conveyance path 261a is formed on the conveyance bench 261, which includes the extended trajectory 266, and trajectories 267a, 267b, and 267c that bifurcate sidewards with respect to the conveyance path 261a. By thus forming the device, normally, two types of the articles 9a and 9h can be conveyed in the same direction, and by adding a vibration component of the Y direction at a specific timing, the specific article 9b can be extracted in the bifurcated trajectories 265a, 265b, and 265c. Therefore, normally, both the articles 9a and 9b are conveyed in the right direction of the figure, and when the specific article 9b reaches the bifurcation point to any one of the lines 267a, 267b, or 267c where the article 9b must be conveyed, the phase difference of the vibrations to the Y direction can be switched by the vibration switching means 232 in FIG. 13, and the article 9b can be also extracted from the desired trajectories 267a, 267b, and 267c. In order to simplify the change in the conveyance direction during the conveyance of the article 9, the vibration switching means 232 in FIG. 13 already stores internally the phase-difference data of the Y-direction vibrations with respect to the Z(K)-direction vibrations for conveying a plurality of articles 9 in the same direction, and the phase-difference data of the Y-direction vibrations with respect to the Z(K)-direction vibrations for sorting the plurality of articles 9 in the Y direction. In addition, by switching both phase differences upon receiving the input of a signal from the outside, which is not shown in the figure, switching can be performed such that the articles 9 that are proceeding in the same direction can be sorted and conveyed, and the articles 9 that are sorted and conveyed can be made to proceed in the same direction.

As described above, an article sorting and conveying device 201 according to the present embodiment comprises: a base 204 as a substrate, an intermediate bench 205 that is elastically supported relative to the base 204 by a plurality of first rod-shaped springs 271 to 271 provided almost parallel and at an inclination with respect to a vertical direction; a movable body 206 that is elastically supported relative to the intermediate bench 205 by second rod-shaped springs 272 to 272 provided almost parallel to the first rod-shaped springs 271 to 271, and on top of which is formed a conveyance surface 261a on which an article 9 is loaded and conveyed; first piezoelectric elements 281 to 281 that act as the first vibration means and second piezoelectric elements 282 to 282 that act as the second vibration means each of which imparts a periodic vibration force from the side of the intermediate bench 205 to the movable body 206 in the K direction that acts as the first direction and the Y direction that acts as the second direction that cross each other and are perpendicular to a longitudinal direction of the second rod-shaped spring members 272 to 272; and a vibration control means 231 of controlling each of the piezoelectric elements 281-282 to cause the periodic vibration force imparted by each of the piezoelectric elements 281-282 to have a phase difference and occur simultaneously at the same frequency, and to create an elliptical vibration trajectory in the movable body 206, wherein the center of gravity of the movable body 206 is configured to almost match to the center of gravity of the intermediate bench 205, and the articles 9a and 9b are sorted and conveyed on the movable body 206 by setting the vibration trajectory of the movable body 206 by the vibration control means 231 such that articles 9a and 9b having a different coefficient of friction are conveyed in different directions.

Because the device is thus configured, along with having a simple device configuration, a three-dimensional elliptical vibration trajectory can be generated in a stable manner without giving rise to titling or turning in the movable body 206, and by controlling the vibrations in accordance with the nature of the articles 9, the articles 9 can be sorted automatically, and each of the sorted articles 9 can be conveyed in an optional direction. Furthermore, because the conveyance surface 261a can be configured as a flat surface, articles ranging from a large size to a small size can be handled by a single device. In addition, the support status of the base 204 with respect to the installation surface can be stabilized, and the transmission of vibrations to the outside can also be controlled, because of which the surrounding environment can also be maintained favorably.

Furthermore, because the movable body 206 is configured by a lower movable bench 262 arranged downward of the intermediate bench 205, a conveyance bench 201 arranged upward of the intermediate bench 205 and including the conveyance surface 261a, and connecting members 263 and 263 that connect the lower movable bench 262 and the conveyance bench 261, the configuration for setting the center of gravity as described above can be implemented in a simpler manner, because of which the overall configuration of the device can be simplified and a smaller and lighter device can be realized.

Based on the second embodiment, the device can also be configured by modifying as described below.

For example, in the above-described second embodiment, the vibration means 281 and 282 for each direction are configured to impart an vibration force in the mutually perpendicular directions to K and Y, respectively, however, as long as vibration trajectories in which the vibration forces are combined together can be generated or changed in the movable body 206, perpendicularity is not necessary, and simply each of the directions may be crossing each other.

Furthermore, in the above-described second embodiment, the piezoelectric elements constitute a bimorph structure in which the first piezoelectric elements 281 and the second piezoelectric elements 282 attached on the side surfaces of the second rod-shaped spring members 272 are provided in sets of two piezoelectric elements including those attached at the back and the front, however, as illustrated in FIG. 20(b), a unimorph structure with only a single piezoelectric element on each side is also possible.

In addition, in the above-described second embodiment, each rod-shaped spring member 271 to 271 and 272 to 272 is provided to be parallel to each other, however, in order to improve the support stability while balancing the centers of gravity of the movable body 206 and the intermediate bench 205 regardless of the shape and size of the conveyance bench 261, it is favorable to change the angle of inclination to the extent that the controllability of vibrations is not lost. Specifically, in order to change the interval between the first rod-shaped spring members 271 to 271 and the interval between the second rod-shaped spring members 272 to 272 in the upward and downward directions, it is possible to have a configuration in which the angle of inclination of each rod-shaped spring member 271 to 272 is changed in the range of ±5°, and a configuration in which the angle of inclination is changed slightly is also included in the scope of "almost parallel" as referred to in the present invention.

Furthermore, in the above-described second embodiment, as illustrated in FIG. 14 and FIG. 15, the first piezoelectric elements 281 and the second piezoelectric elements 282 are attached toward the lower end from near the center of the longitudinal direction of the second rod-shaped spring members 272, however, it is possible to have a configuration in which the piezoelectric elements are attached in the opposite upper end, or a configuration in which the piezoelectric elements are attached toward the lower end as well as toward the upper end, respectively.

Figure 23:
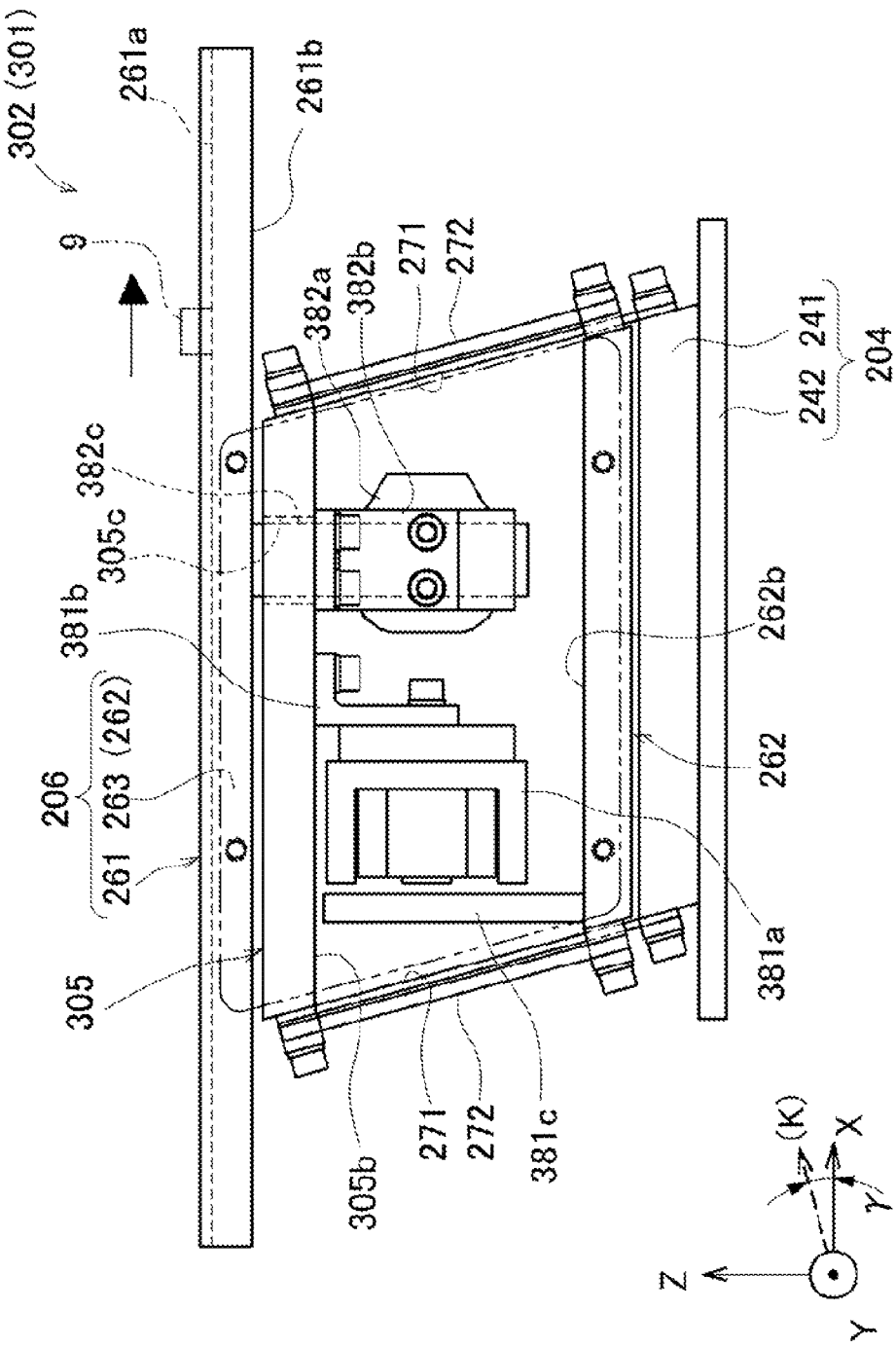
[FIG. 23]
Figure 24:
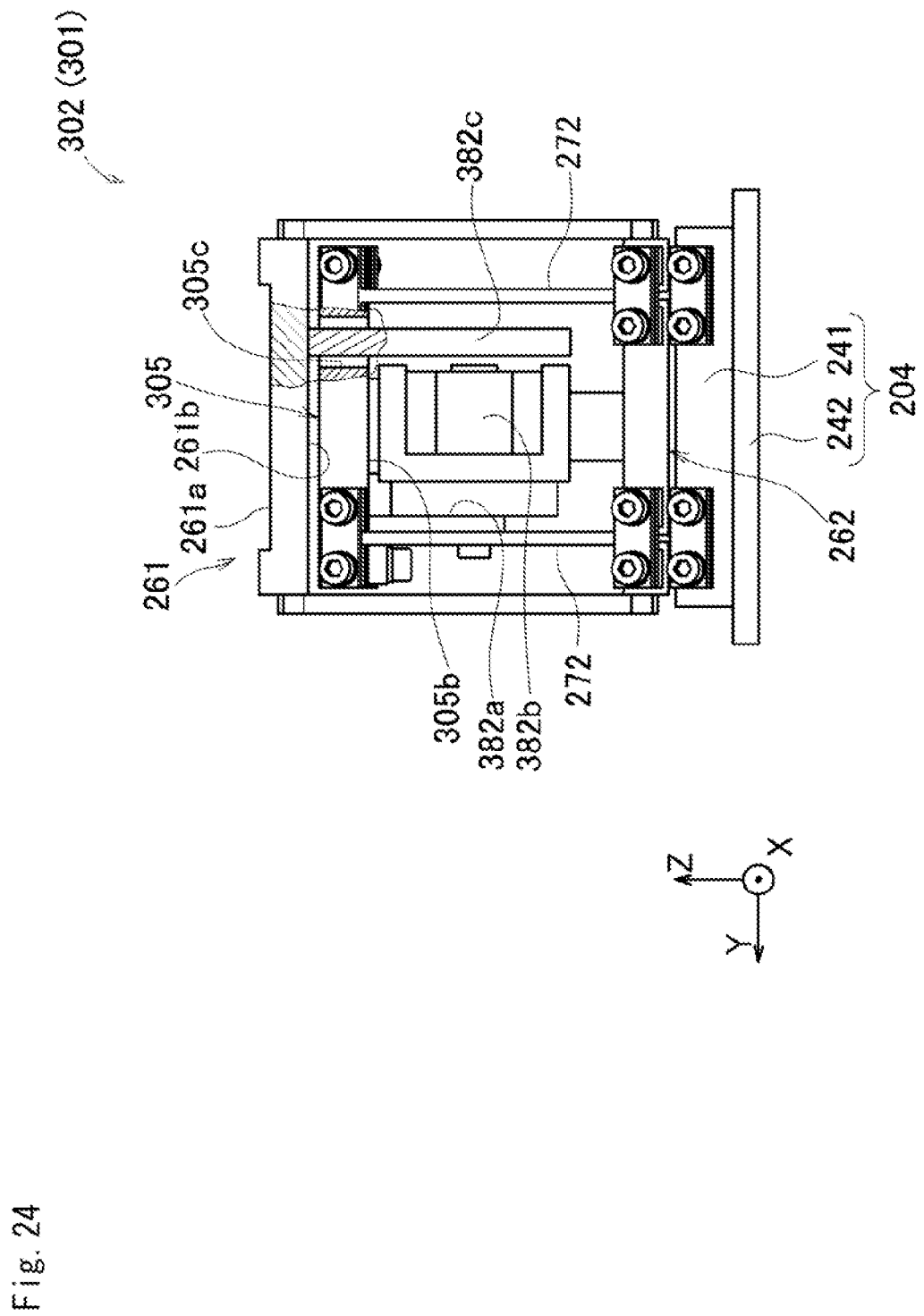
[FIG. 24]

Furthermore, a modification in which each of the first vibration means and the second vibration means of the above-described second embodiment is configured by using other than piezoelectric elements is illustrated in FIG. 23 and FIG. 24. In the figures, the portions assigned with the same symbol as the above-described embodiment indicate the same constituent element. In the present modification, instead of piezoelectric elements, electromagnets 381a and 382a are used as the vibration means of the K direction and the Y direction.

Specifically, as the first vibration means that imparts a periodic vibration force in the K direction, there is provided the electromagnet 381a on a lower surface 305b of an intermediate bench 305 such that the magnetic pole face faces the X direction via an L-shaped bracket 381b, and at the same time, there is provided a magnetic plate 381c that rises up from an upper surface 262b of the lower movable bench 262 while facing the above-described magnetic pole face. Thus, when electric current is passed in the electromagnet 381a, it becomes possible to generate a relative displacement in the K direction between the intermediate bench 205 and the movable body 206 by combining together with the support direction based on the second rod-shaped spring members 272. In addition, as the second vibration means that imparts a periodic vibration force in the Y direction, there is provided the electromagnet 382a in the lower surface 305b of the intermediate bench 305 such that the magnetic pole face faces the Y direction via the L-shaped bracket 382b, and there is provided a magnetic plate 382c that extends in the downward direction from a lower surface 261b of the conveyance bench 261 while facing the above-described magnetic pole face. In a fixed bench 305, an opening 382c is formed at a position corresponding to the magnetic plate 382c that prevents interference between the fixed bench and the magnetic plate. Thus, when electric current is passed in the electromagnet 382a, it becomes possible to generate a relative displacement in the Y direction between the intermediate bench 205 and the movable body 206 by combining together with the support direction based on the second rod-shaped spring members 272.

Even when each vibration means is thus configured by using the electromagnets 381a and 382a, by controlling the current value in each direction, the same effect as above can be obtained, and a large output can be easily obtained in comparison with the case when the operation in the K direction and the Y direction is performed by piezoelectric elements.

It must be noted that the specific configuration of each unit is not restricted only to the above first embodiment and second embodiment, as well as the modifications thereof.

For example, in the above-described first and second embodiments, the sorting and conveyance of articles 9 is configured to be performed with reference to the coefficient of friction by focusing on the coefficient of friction of each article 9, however, as described earlier, there may be no hindrance in handling the articles 9 as articles 9 that have an apparently different coefficient of friction even when the local coefficient of friction is the same depending on the surface profile of the articles 9. Furthermore, by changing the surface profile of the article 9 to a large extent, rolling and swinging can be performed on the movable bench 6 (the conveyance bench 261 in the case of the second embodiment), which may make it impossible to effectively perform transmission of the thrust due to friction. In addition, the geometric profile changes that occur from the relationship between the hardness of the surface of the movable bench 6 (the conveyance bench 261) and the weight and hardness of the article 9 also influence the thrust exerted on the articles 9. Therefore, in addition to the coefficient of friction in the usual sense, the thrust acting on the article 9 in reality in the horizontal direction, including the effect such as changes in the profile due to the surface profile and surface roughness of the article 9 and the movable bench 6 (the conveyance bench 261), and also the weight and hardness thereof, are captured as the frictional force in a broad sense, and with reference to the frictional force in the broad sense, it becomes possible to configure to control the vibration component of each direction, and sort and convey the articles 9. As long as such a concept is adopted, it is possible to incorporate the above-described frictional force in a broad sense into the coefficient of friction used as the reference for sorting and conveying the articles 9. In other words, by assuming the coefficient obtained by dividing the above-described frictional force in a broad sense by the normal force of the movable bench 6 (the movable body 206 in the second embodiment) with respect to the article 9 as the coefficient of friction in a broad sense, and then replacing with the general coefficient of friction and using as a reference, several types of articles 9 can be sorted and conveyed, and the idea of the present invention includes such content as well. Furthermore, in the above-described first and second embodiments, by performing control with reference to the coefficient of friction, the articles 9 are sorted and conveyed by changing the thrust with respect to each article 9, however, as long as the thrust can be changed by changing the frictional force in a broad sense as described above, a different parameter can be used as the reference in place of the coefficient of friction, which enables configuring an article sorting and conveying device having the same effect, and such a configuration is also included in the uniform scope of the present invention.

Various other changes may be applied to other configurations without departing from the spirit and scope of the present invention.

INDUSTRIAL APPLICABILITY

According to the first invention described above in detail, it is possible to provide an article sorting and conveying device having a simple configuration, by which a plurality of articles are sorted simultaneously and each article can be conveyed in an optional direction, and articles having several sizes and shapes can be handled. Furthermore, according to the second invention, it is possible to provide an article sorting and conveying device having a simple configuration, which can generate stable vibrations by the movable body, which can sort articles in a stable manner by the vibrations, and can convey each of the sorted articles in an optional direction, and which is able to be easily used in a production line.

REFERENCE SIGNS LIST

1 . . . Article sorting and conveying device
4 . . . Substrate
5 . . . Elastic support means
6 . . . Movable bench (movable body)
9, 9a, 9b . . . Article
31 . . . Vibration control means
32 . . . Vibration switching means
34 . . . Oscillator
52 . . . Spring member
71 . . . First piezoelectric element (first vibration means)
72 . . . Second piezoelectric element (second vibration means)
201 . . . Article sorting and conveying device
204 . . . Base (substrate)
205 . . . Intermediate bench
205g, 205G . . . Center of gravity (of the intermediate bench)
206 . . . Movable body
206g, 206G . . . Center of gravity (of the movable body)
231 . . . Vibration control means
232 . . . Vibration switching means
261 . . . Conveyance bench
261a . . . Conveyance surface
262 . . . Lower movable bench
263 . . . Connecting member
271 . . . First rod-shaped spring member
272 . . . Second rod-shaped spring member
281 . . . First piezoelectric element (first vibration means)
282 . . . Second piezoelectric element (second vibration means)

The invention claimed is:
1. An article sorting and conveying device that is provided with a movable body provided on a substrate through an elastic support unit and that conveys the articles loaded on the movable body by the vibrations of the movable body, comprising:
    a first vibration unit that imparts a periodic vibration force to the movable body in a direction inclined from a vertical direction;
    a second vibration unit that imparts a periodic vibration force to the movable body in a direction crossing the periodic vibration force by the first vibration unit;
    and a vibration control unit that controls each vibration unit to cause a periodic vibration force imparted by each vibration unit to have a phase difference and occur simultaneously at the same frequency, and to create an elliptical vibration trajectory in the movable body, wherein
    the articles are sorted and conveyed on the movable body by setting the vibration trajectory of the movable body by the vibration control unit such that articles having a different coefficient of friction are conveyed in different directions.

2. The article sorting and conveying device according to claim 1, wherein
    a guide that moves the sorted articles along a predetermined trajectory is provided on the movable body.

3. The article sorting and conveying device according to claim 1, wherein
    a vibration switching unit that switches the vibration trajectory of the movable body with a different vibration trajectory is provided such that the vibration switching unit internally stores data of a phase difference according to which articles having a different coefficient of friction are conveyed in a different direction, and data of a phase difference according to which articles having a different coefficient of friction are conveyed in the same direction, which constitutes the phase difference of the periodic vibration force by each of the vibration unit, and also switches the phase difference in accordance with a signal input from outside.

4. The article sorting and conveying device according to claim 2, wherein
    a vibration switching unit that switches the vibration trajectory of the movable body with a different vibration trajectory is provided such that the vibration switching unit internally stores data of a phase difference according to which articles having a different coefficient of friction are conveyed in a different direction, and data of a phase difference according to which articles having a different coefficient of friction are conveyed in the same direction, which constitutes the phase difference of the periodic vibration force by each of the vibration unit, and also switches the phase difference in accordance with a signal input from outside.

5. An article sorting and conveying device, comprising:
a substrate;
an intermediate bench that is elastically supported relative to the substrate by a plurality of first rod-shaped springs provided almost parallel and at an inclination with respect to a vertical direction;
a movable body that is elastically supported relative to the intermediate bench by second rod-shaped springs provided almost parallel to the first rod-shaped springs, and on top of which is formed a conveyance surface on which the articles are loaded and conveyed;
a first vibration unit and a second vibration unit each of which imparts a periodic vibration force from the intermediate bench side to the movable body in a first direction and a second direction that cross each other and are perpendicular to a longitudinal direction of the second rod-shaped springs; and
a vibration control unit that controls each vibration unit to cause a periodic vibration force imparted by each vibration unit to have a phase difference and occur simultaneously at the same frequency, and to create an elliptical vibration trajectory in the movable body, wherein
a center of gravity of the movable body is configured to almost match the center of gravity of the intermediate bench, and
the articles are sorted and conveyed on the movable body by setting the vibration trajectory of the movable body by the vibration control unit such that articles having a different coefficient of friction are conveyed in different directions.

6. The article sorting and conveying device according to claim 5, wherein
    the movable body is configured by:
    a lower movable bench arranged downward of the intermediate bench;
    a conveyance bench arranged upward of the intermediate bench and including the conveyance surface; and
    a connecting member that connects the lower movable bench and the conveyance bench.

* * * * *